US010896105B2

(12) United States Patent
Pang et al.

(10) Patent No.: US 10,896,105 B2
(45) Date of Patent: *Jan. 19, 2021

(54) SAS STORAGE VIRTUALIZATION CONTROLLER, SUBSYSTEM AND SYSTEM USING THE SAME, AND METHOD THEREFOR

(75) Inventors: Ching-Te Pang, Taipei Hsien (TW); Michael Gordon Schnapp, Taipei Hsien (TW); Shiann-Wen Sue, Taipei Hsien (TW); Cheng-Yu Lee, Taipei Hsien (TW)

(73) Assignee: Infortrend Technology, Inc., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/616,776

(22) Filed: Sep. 14, 2012

(65) Prior Publication Data

US 2013/0013828 A1 Jan. 10, 2013

Related U.S. Application Data

(63) Continuation of application No. 11/246,309, filed on Oct. 11, 2005, now Pat. No. 8,301,810.

(60) Provisional application No. 60/593,212, filed on Dec. 21, 2004.

(51) Int. Cl.
*G06F 3/06* (2006.01)
*G06F 11/20* (2006.01)
*G06F 11/14* (2006.01)

(52) U.S. Cl.
CPC ........ *G06F 11/2089* (2013.01); *G06F 3/0607* (2013.01); *G06F 3/0611* (2013.01); *G06F 3/0659* (2013.01); *G06F 3/0661* (2013.01); *G06F 3/0664* (2013.01); *G06F 3/0689* (2013.01); *G06F 11/201* (2013.01); *G06F 3/061* (2013.01); *G06F 3/0613* (2013.01); *G06F 11/1469* (2013.01)

(58) Field of Classification Search
CPC .. G06F 11/1076; G06F 3/0658; G06F 3/0689; G06F 3/0611; G06F 3/0659; G06F 3/0613; G06F 3/061; G06F 11/2089; G06F 3/1469
USPC .......................................................... 710/74
See application file for complete search history.

(56) References Cited

U.S. PATENT DOCUMENTS

| | | | | |
|---|---|---|---|---|
| 6,061,750 A | * | 5/2000 | Beardsley et al. | 710/74 |
| 6,542,960 B1 | * | 4/2003 | Wong | G06F 11/1076 711/114 |
| 7,681,061 B2 | * | 3/2010 | Suzuki et al. | 713/340 |
| 2002/0152355 A1 | * | 10/2002 | Otterness et al. | 711/114 |
| 2002/0188800 A1 | * | 12/2002 | Tomaszewski et al. | 711/112 |
| 2003/0193776 A1 | * | 10/2003 | Bicknell et al. | 361/685 |
| 2004/0010660 A1 | * | 1/2004 | Konshak et al. | 711/114 |
| 2004/0024963 A1 | * | 2/2004 | Talagala | G06F 11/1076 711/114 |

(Continued)

*Primary Examiner* — Ernest Unelus
(74) *Attorney, Agent, or Firm* — Winston Hsu

(57) ABSTRACT

A storage virtualization computer system. The storage virtualization computer system comprises a host entity for issuing an IO request, a SAS storage virtualization controller coupled to the host entity for executing IO operations in response to the IO request, and at least one physical storage device, each coupled to the storage virtualization controller through a SAS interconnect, for providing data storage space to the storage virtualization computer system through the SAS storage virtualization controller.

77 Claims, 31 Drawing Sheets

(56) References Cited

U.S. PATENT DOCUMENTS

2004/0177218 A1* 9/2004 Meehan et al. ............... 711/114
2004/0250019 A1* 12/2004 Fujie ................... G06F 11/1076
  711/114
2005/0010709 A1* 1/2005 Davies ................ G06F 11/1456
  710/305
2006/0206494 A1* 9/2006 Ibrahim et al. ................. 707/10
2007/0220316 A1* 9/2007 Guha et al. ........................ 714/6

* cited by examiner

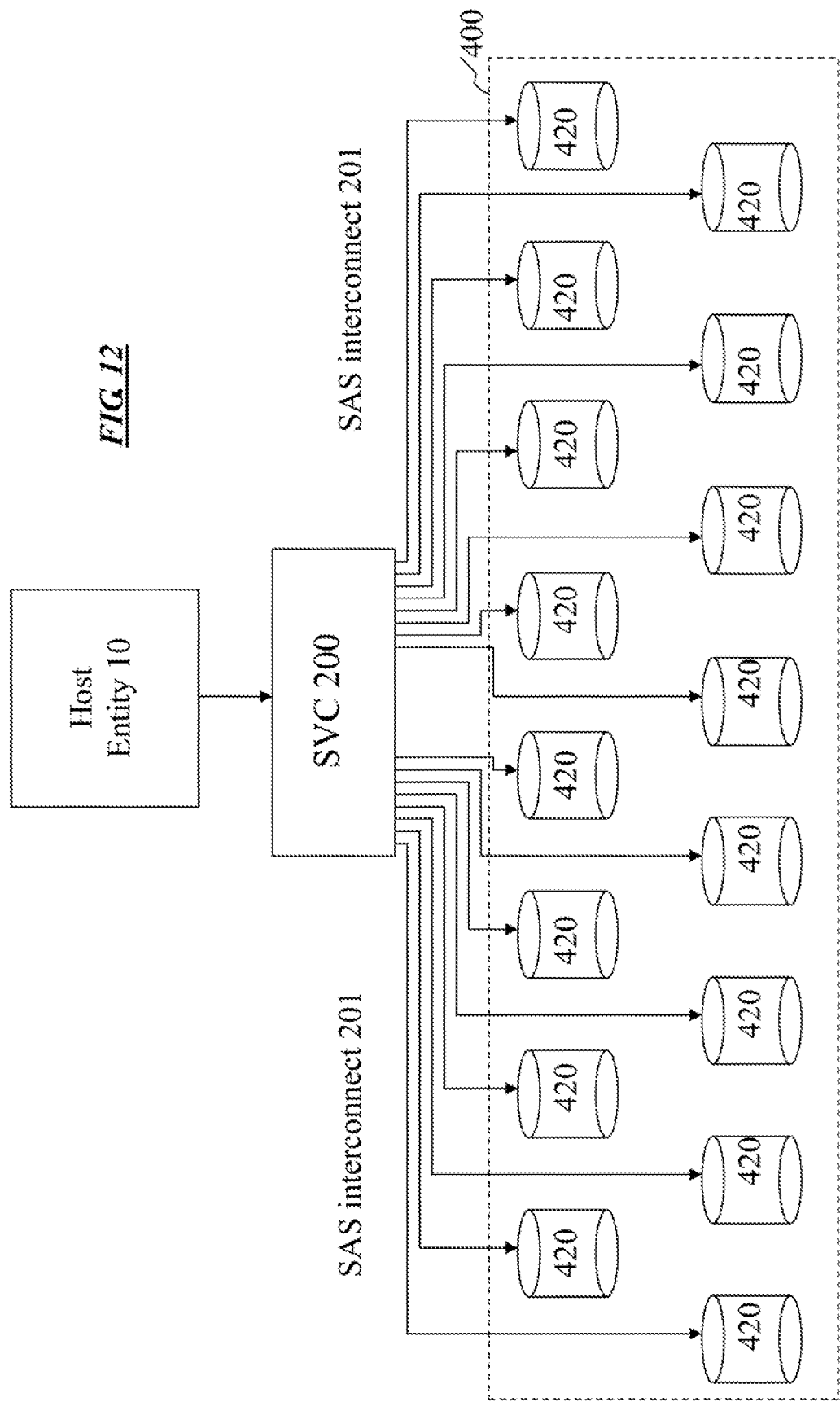

SAS STORAGE VIRTUALIZATION CONTROLLER, SUBSYSTEM AND SYSTEM USING THE SAME, AND METHOD THEREFOR

CROSS-REFERENCE TO RELATED APPLICATION

This application is a Continuation Application of U.S. patent application Ser. No. 11/246,309, filed on Oct. 11, 2005, which claims the benefit of U.S. provisional application Ser. No. 60/593,212, filed on Dec. 21, 2004, the entirely of which are incorporated herein by reference.

BACKGROUND OF THE INVENTION

1. Field of the Invention

The present invention pertains to a storage virtualization controller and a subsystem using the same, particularly pertaining to a storage virtualization controller using SAS device-side IO device interconnect for connecting between a host system and a direct access storage device, and a subsystem using the same.

2. Description of the Related Art

Storage virtualization is a technology that has been used to virtualize physical storage by combining sections of physical storage devices (PSDs) into logical storage entities, herein referred to as logical media units (LMUs), that are made accessible to a host system. This technology has been used primarily in redundant arrays of independent disks (RAID) storage virtualization, which combines smaller physical storage devices into larger, fault tolerant, higher performance logical media units via RAID technology.

A Storage virtualization Controller, abbreviated SVC, is a device the primary purpose of which is to map combinations of sections of physical storage media to logical media units visible to a host system. IO requests received from the host system are parsed and interpreted and associated operations and data are translated into physical storage device IO requests. This process may be indirect with operations cached, delayed (e.g., write-back), anticipated (read-ahead), grouped, etc., to improve performance and other operational characteristics so that a host IO request may not necessarily result directly in physical storage device IO requests in a one-to-one fashion.

An External (sometimes referred to as "Stand-alone") Storage Virtualization Controller is a Storage Virtualization Controller that connects to the host system via an IO interface and that is capable of supporting connection to devices that reside external to the host system and, in general, operates independently of the host.

One example of an external Storage Virtualization Controller is an external, or stand-alone, direct-access RAID controller. A RAID controller combines sections on one or multiple physical direct access storage devices (DASDs), the combination of which is determined by the nature of a particular RAID level, to form logical media units that are contiguously addressable by a host system to which the logical media unit is made available. A single RAID controller will typically support multiple RAID levels so that different logical media units may consist of sections of DASDs combined in different ways by virtue of the different RAID levels that characterize the different units.

Another example of an external Storage Virtualization Controller is a JBOD emulation controller. A JBOD, short for "Just a Bunch of Drives", is a set of physical DASDs that connect directly to a host system via one or more a multiple-device IO device interconnect channels. DASDs that implement point-to-point IO device interconnects to connect to the host system (e.g., Parallel ATA HDDs, Serial ATA HDDs, etc.) cannot be directly combined to form a "JBOD" system as defined above for they do not allow the connection of multiple devices directly to the IO device channel. An intelligent "JBOD emulation" device can be used to emulate multiple multiple-device IO device interconnect DASDs by mapping IO requests to physical DASDs that connect to the JBOD emulation device individually via the point-to-point IO-device interconnection channels.

Another example of an external Storage Virtualization Controller is a controller for an external tape backup subsystem.

The primary function of a storage virtualization controller, abbreviated as SVC, is to manage, combine, and manipulate physical storage devices in such a way as to present them as a set of logical media units to the host. Each LMU is presented to the host as if it were a directly-connected physical storage device (PSD) of which the LMU is supposed to be the logical equivalent. In order to accomplish this, IO requests sent out by the host to be processed by the SVC that will normally generate certain behavior in an equivalent PSD also generate logically equivalent behavior on the part of the SVC in relation to the addressed logical media unit. The result is that the host "thinks" it is directly connected to and communicating with a PSD when in actuality the host is connected to a SVC that is simply emulating the behavior of the PSD of which the addressed logical media unit is the logical equivalent.

In order to achieve this behavioral emulation, the SVC maps IO requests received from the host to logically equivalent internal operations. Some of these operations can be completed without the need to directly generate any device-side IO requests to device-side PSDs. Among these are operations that are processed internally only, without ever the need to access the device-side PSDs. The operations that are initiated as a result of such IO requests will herein be termed "internally-emulated operations".

There are operations that cannot be performed simply through internal emulation and yet may not directly result in device-side PSD accesses. Examples of such include cached operations, such as data read operations in which valid data corresponding to the media section addressed by the IO request currently happens to reside entirely in the SVC's data cache, or data write operations when the SVC's cache is operating in write-back mode so that data is written into the cache only at first, to be committed to the appropriate PSDs at a future time. Such operations will be referred to as "asynchronous device operations" (meaning that any actual IO requests to device-side PSDs that must transpire in order for the requested operation to achieve its intended goal are indirectly performed either prior or subsequent to the operation rather than directly in response to the operation).

Yet another class of operations consists of those that directly generate device-side IO requests to PSDs in order to complete. Such operations will be referred to as "synchronous device operations".

Some host-side IO requests may map an operation that may consist of multiple sub-operations of different classes, including internally-emulated, asynchronous device and/or synchronous device operations. An example of a host-side IO request that maps to a combination of asynchronous and synchronous device operations is a data read request that addresses a section of media in the logical media unit part of whose corresponding data currently resides in cache and part of whose data does not reside in cache and therefore must be read from the PSDs. The sub-operation that takes data from the cache is an asynchronous one because the sub-operation does not directly require device-side PSD accesses to complete, however, does indirectly rely on results of previously-executed device-side PSD accesses. The sub-operation that reads data from the PSDs is a synchronous one, for it requires direct and immediate device-side PSD accesses in order to complete.

Traditionally storage virtualization has been done with Parallel SCSI or Fibre IO device interconnects as the primary device-side IO device interconnects connecting physical storage devices to the storage virtualization controller. Both Parallel SCSI and Fibre are multiple-device IO device interconnects. A multiple-device IO device interconnect is a form of IO device interconnect that allows multiple IO devices to be connected directly, meaning without the need for any extra off-device intervening active circuitry, to a single host system or multiple host systems (note that typical FC-AL JBODs do have off-device active circuitry, but the purpose of this circuitry is not to enable the interconnection but rather to accommodate the possibility of a failure in the DASD or a swapping out of the DASD that might cause a fatal break in the IO interconnect). Common examples of multiple-device IO device interconnects are Fibre channel FC-AL and Parallel SCSI. Multiple-device IO device interconnects share bandwidth among all hosts and all devices interconnected by the interconnects.

Please refer to FIG. 23, which is a block diagram of a conventional storage virtualization computer system using Parallel SCSI as the primary device-side IO device interconnect. With the Parallel SCSI device-side IO device interconnect, the total bandwidth is limited to 320 MB/s per interconnect, or 1280 MB/s accumulated bandwidth for an implementation like the one diagramed in FIG. 23 with 4 Parallel SCSI device-side interconnects. Please refer to FIG. 24, which is a block diagram of a conventional storage virtualization computer system using Fibre FC-AL as the primary device-side IO device interconnect. With the Fibre FC-AL device-side IO device interconnect, the total bandwidth is limited to 200 MB/s per interconnect, or 800 MB/s accumulated bandwidth for an implementation like the one diagramed in FIG. 24 with 4 Fibre device-side interconnects.

Multiple-device IO device interconnects, for example Parallel SCSI, suffer from the shortcoming that a single failing device connected on the interconnect could interfere with communications and/or data transfer between hosts and other devices sharing the interconnect. Fibre FC-AL implementations have alleviated this concern to a certain extent by providing dual redundant interconnects that provide two paths to each device should one path break or become blocked for some reason (e.g., interference from another failing device). However, this is still inferior to a dedicated interconnect per storage device, for independent failures on both interconnects could still result in disabling interference concurrently on both interconnects. Dedicated interconnects, on the other hand, insure full signal integrity independence between interconnects so that a failure on one will not affect another.

Parallel SCSI, however, suffers from the drawback that device-side IO device interconnects at most, only protect the payload data portion of information and not the control information (e.g., block address, data length, etc). In addition, Parallel SCSI interconnects do not scale well beyond a certain point because of the number of dedicated signal lines (68) that must be used to form each distinct interconnect. Moreover, Parallel SCSI, because of its parallel nature, will not be able to easily support higher interface speeds.

In the co-pending U.S. patent application Ser. No. 10/707,871, entitled "STORAGE VIRTUALIZATION COMPUTER SYSTEM AND EXTERNAL CONTROLLER THEREFOR," Ser. No. 10/708,242, entitled "REDUNDANT EXTERNAL STORAGE VIRTUALIZATION COMPUTER SYSTEM," and Ser. No. 10/709,718, entitled "JBOD SUBSYSTEM AND EXTERNAL EMULATION CONTROLLER THEREOF," a computer system comprising a SVS implementing SATA interconnects were disclosed in which when using a SATA SVC, a SATA DASD is considered to be the primary DASD.

Therefore, there is a need for a SVS using SAS DASDs as the primary DASDs thereof. Moreover, there is a need for a SVS that can use a second type of DASD, such as SATA DASD, as a primary DASD rather than the SAS DASDs in addition to the capability of using SAS DASDs as the primary DASDs.

SUMMARY OF THE INVENTION

It is therefore a primary object of the present invention is to provide SAS (Serial Attached SCSI) storage virtualization controller and subsystem which provide storage virtualization to host systems using SAS IO device interconnects as the primary device-side IO device interconnect connecting physical storage devices to the storage virtualization controller. The system containing such Storage Virtualization Controller and Subsystem, and the methods therefor are also provided.

According to the claimed invention, a storage virtualization computer system is provided. The storage virtualization computer system comprises a host entity for issuing IO requests; an external storage virtualization controller coupled to said host entity for executing IO operations in response to said IO requests; and, at least one physical storage device (PSD), each coupled to the storage virtualization controller through a SAS interconnect, for providing storage to the storage virtualization computer system through the storage virtualization controller.

According to the claimed invention, a storage virtualization computer subsystem is provided. The storage virtualization computer subsystem comprises an external storage virtualization controller for connecting to a host entity and executing IO operations in response to IO requests issued from said host entity; and at least one physical storage device, each coupled to the storage virtualization controller through a SAS interconnect, for providing storage to the host entity through the storage virtualization controller.

According to the claimed invention, a storage virtualization controller is provided. The storage virtualization controller comprises a central processing circuitry for performing IO operations in response to IO requests from a host entity; at least one IO device interconnect controller coupled to said central processing circuitry; at least one host-side IO device interconnect port provided in a said at least one IO device interconnect controller for coupling to said host entity; and at least one SAS device-side IO device interconnect port provided in a said at least one IO device interconnect controller for coupling to and performing point-to-point serial-signal transmission with at least one physical storage device.

According to the claimed invention, a method for performing storage virtualization in a computer system with an external storage virtualization controller of the computer system is provided. The method comprises receiving an IO request from a host entity of the computer system with the storage virtualization controller; parsing the IO request with the storage virtualization controller to decide at least one IO operation to perform in response to said IO request; and performing at least one IO operation with the storage virtualization controller to access at least one physical storage device of the computer system in point-to-point serial-signal transmission complying with SAS protocol.

It is an advantage of the claimed invention that in the storage virtualization computer system using SAS as the primary device-side IO device interconnect, each physical storage device has a dedicated interconnect to the storage virtualization controller.

It is another advantage of the claimed invention that not only the payload data portion of information but also the control information are protected by the SAS IO device interconnect.

These and other objectives of the present invention will no doubt become obvious to those of ordinary skill in the art after reading the following detailed description of the preferred embodiments that is illustrated in the various drawing figures.

BRIEF DESCRIPTION OF THE DRAWINGS

FIG. 12 is a block diagram of a storage virtualization computer system according to the present invention;

DETAILED DESCRIPTION OF THE PREFERRED EMBODIMENTS

FIGS. 1 through 11B exemplifying the main architecture of the present invention. Further details of the operation flows and certain detail structure of the present invention will be explained further according to FIGS. 12 through 22.

Figure 1:
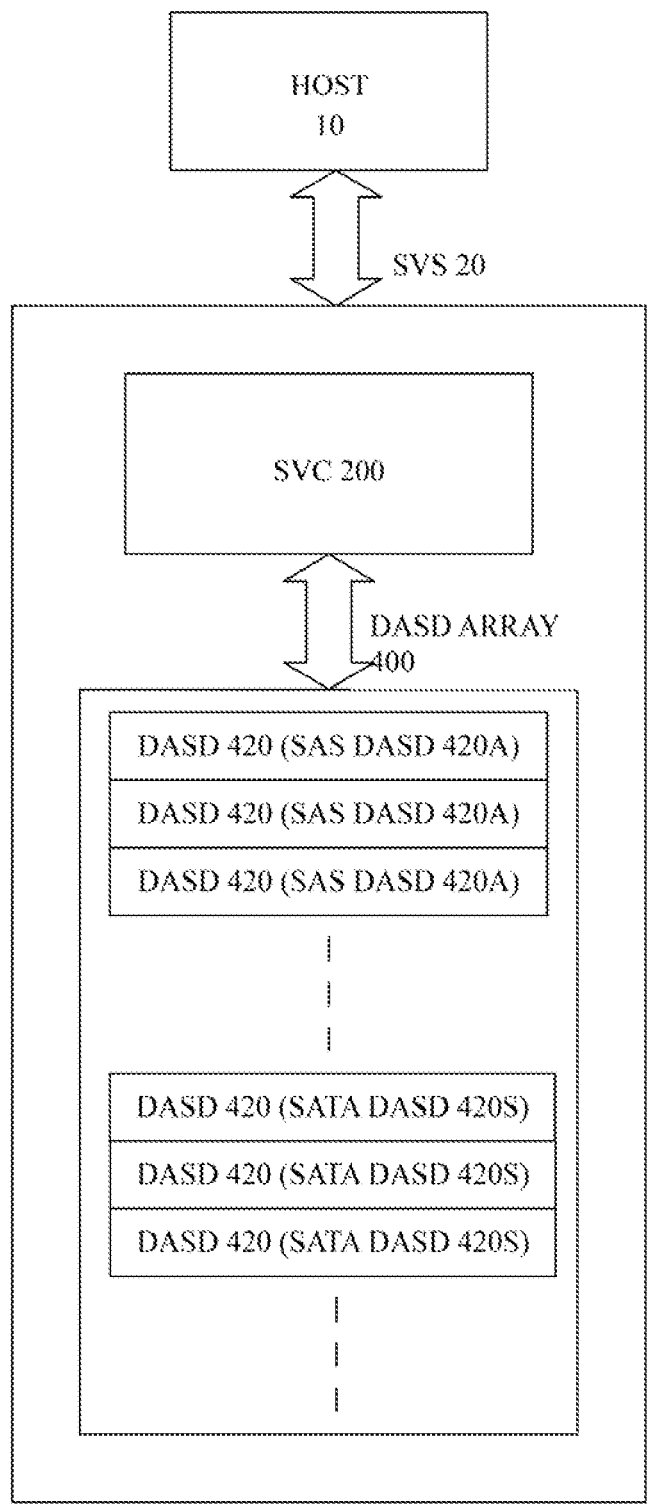
FIG. 1 is a block diagram showing a main structure of an embodiment of a system according to the present invention.

FIG. 1 is a block diagram showing a main structure of an embodiment of a system comprising a SVS (Storage Virtualization Subsystem) and SVC (Storage Virtualization Controller) according to the present invention. The system according to the present invention comprises a host computer 10 and a SVS 20 connecting thereto. Although there is illustrated in FIG. 1 only one host 10 connected with one SVS 20, there can be more than one SVS 20 attached to the host 10; or, more than one host 10 can be attached to the SVS 20. Or more than one host 10 can be attached to more than one SVS 20.

The host 10 can be a server system, a work station, or a PC system, or the like. Alternatively, the host 10 can be another SVC. The SVS 20 comprises a SVC (Storage Virtualization Controller) 200, which can be a RAID controller or a JBOD emulator, and a DASD (direct access storage device) array 400. Although only one DASD array 400 is illustrated here, more then one DASD array 400 can be attached to the SVC 200.

The SVC 200 is a SAS SVC, i.e., a SVC implemented complying with the SAS protocol. The SVC 200 receives the IO requests and related data (the control signals and data signals) from the host 10 and executes the IO requests internally or map them to the DASD array 400. The SVC 200 can be used to enhance performance and/or to improve data availability and/or to increase storage capacity of a single logical media unit (e.g. a logical disk) in view of the host 10. The DASD array 400 comprises a plurality of DASDs 420, such as hard disk drive (HDD), which comprises either SAS DASDs 420A or SATA DASDs 420s or both.

When a logical media unit in the SVS 20 is set to use a RAID level other than level 0 or 1, for example, levels 3 through 6, the DASDs 420 contains at least one parity DASD, that is, a DASD which contains parity data therein, and data availability can thus be improved. In addition, the performance can be improved in execution of an IO operation, since the accessed data is distributed among more than one DASD. Moreover, since the logical media unit is a combination of sections of a plurality of DASDs, the accessible storage capacity in a single logical media unit can be largely increased. For example, in a RAID subsystem of RAID level 5, the functionality described above can all be achieved, in a RAID subsystem of RAID level 6, it is similar to RAID 5, but it contains parity data that can protect against data loss due to two failed DASDs and increases the data availability of the storage system.

When a logical media unit in the SVS 20 is set to use a RAID level 1, the same data will be stored in two separate DASDs, and thus data availability can be greatly enhanced at the cost of doubling the DASD cost.

When a logical media unit in the SVS 20 is set to use a RAID level 0, performance improvement rather than the availability concern is the main issue and thus no enhancement of data availability is provided. Performance, however, can be greatly improved. For example, a RAID subsystem of RAID level 0 having 2 hard disk drives can have, theoretically, a performance of 200% of a storage device having only one hard disk drive, since different data sections can be stored into the two separate hard disk drives at the same time under the control of the SVC 200.

Figure 2A:
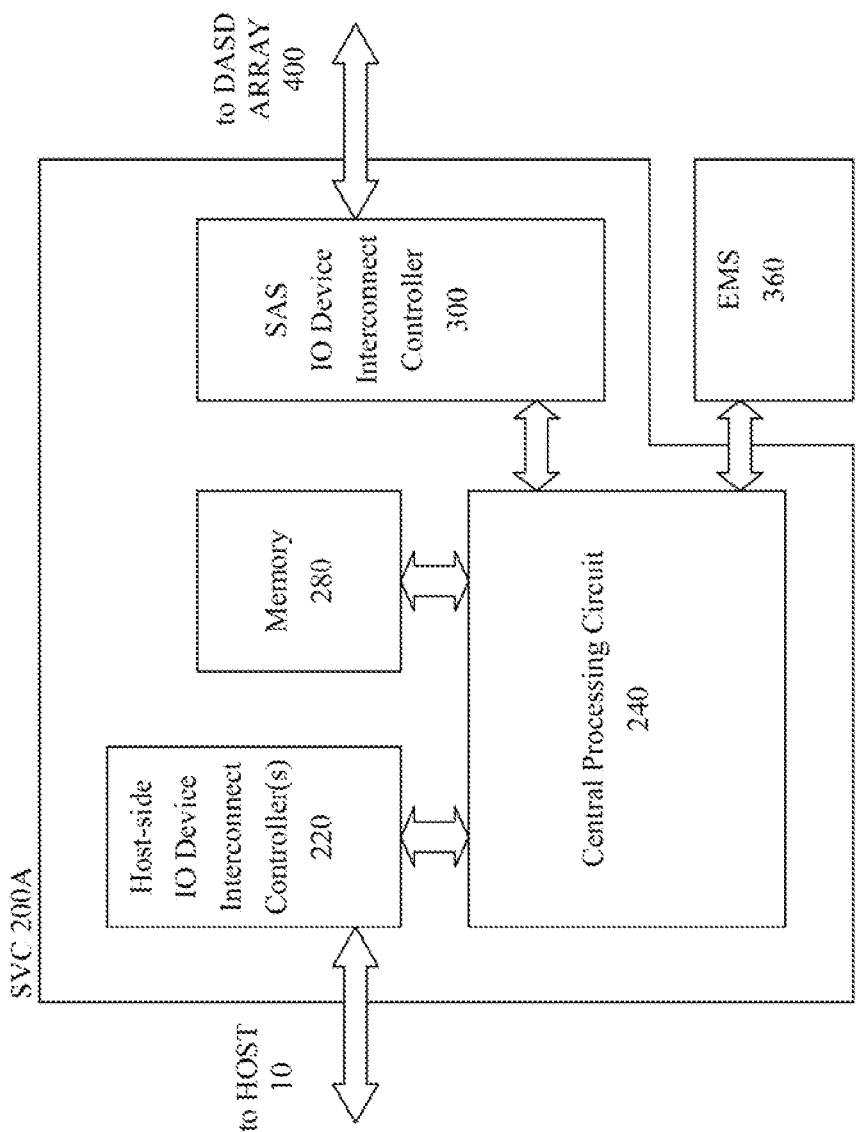
FIG. 2A is a block diagram showing a first embodiment of an SVC 200 according to the present invention and the connection thereof to the host and the DASD array.

FIG. 2A is a block diagram showing a first embodiment of an SVC 200 according to the present invention and the connection thereof to the host and the DASD array. In this embodiment, the SVC 200A comprises a host-side IO device interconnect controller 220, a CPC (central processing circuitry) 240, a memory 280, and a SAS (Serial Attached SCSI) IO device interconnect controller (or the device-side IO device interconnect controller) 300. Although illustrated in separate functional blocks, two or more or even all of these functional blocks can be incorporated into to one chip in practical implementation.

The host-side IO device interconnect controller 220 is connected to the host 10 and the CPC 240. The host-side IO device interconnect controller 220 is an interface and buffer between the SVC 200A and the host 10, and receives IO requests and related data from the host and map and/or transfer them to the CPC 240.

When the CPC 240 receives the IO requests of the host 10 from the host-side IO device interconnect controller 220, CPC 240 parses it and performs some operations in response to the IO requests and sends the data requested and/or reports and/or information of the SVC 200A back to the host 10 through the host-side IO device interconnect controller 220.

After parsing a request received from the host 10, while a read request is received and one or more operations are performed in response, the CPC 240 gets the requested data either internally or from the memory 280 or in both ways and transfers them to the host 10. If the data is not available either internally or does not exists in the memory 280, IO request will be issued to the DASD array 400 through the SAS IO device interconnect controller 300 and the requested data will be transferred from the DASD array 400 to memory 280 and then passed to the host 10 through host-side IO device interconnect controller 220.

When a write request is received from the host 10, after parsing the request and performing one or more operations, the CPC 240 gets the data from the host 10 through host-side IO device interconnect controller 220, stores them to the memory 280 and then move them out to the DASD array 400 through the CPC 240. When the write request is a write back request, the IO complete report can be issued to the host first and then the CPC 240 performs the actual write operation later. Otherwise, when the write request is a write through request, an IO complete report is issued to the host 10 after the requested data is actually written into the DASD array 400.

The memory 280 is connected to the CPC 240 and acts as a buffer therefor to buffer the data transferred between the host 10 and the DASD array 400 passing the CPC 240. In one embodiment, the memory 280 can be a DRAM; more particularly, the DRAM can be a SDRAM.

The SAS IO device interconnect controller 300 is the device-side IO device interconnect controller connected to the CPC 240 and the DASD array 400. The SAS IO device interconnect controller 300 is an interface and buffer between the SVC 200A and the DASD array 400, and receives IO requests and related data issued from CPC 240 and map and/or transfer them to the DASD array 400. The SAS IO device interconnect controller 300 re-formats the data and control signals received from CPC 240 to comply with SAS protocol and transmits them to the DASD array 400.

When the DASD 420 in the DASD array 400 receives the IO requests of the CPC 240 through the SAS IO device interconnect controller 300, it performs some operations in response to the IO requests and transfers the requested data and/or reports and/or information to and/or from the CPC 240. More than one type of DASDs 420 can be provided in the DASD array 400. For example, the DASD array 400 comprises both SAS DASDs 420A and SATA DASDs 420S.

An enclosure management service circuitry (EMS) 360 can be attached to the CPC 240 for management circuitry on an enclosure for containing the DASD array 400. In another arrangement of the SVS, the enclosure management service circuitry (EMS) 360 can be omitted, depending on the actual requirements of the various product functionality.

Figure 2B:
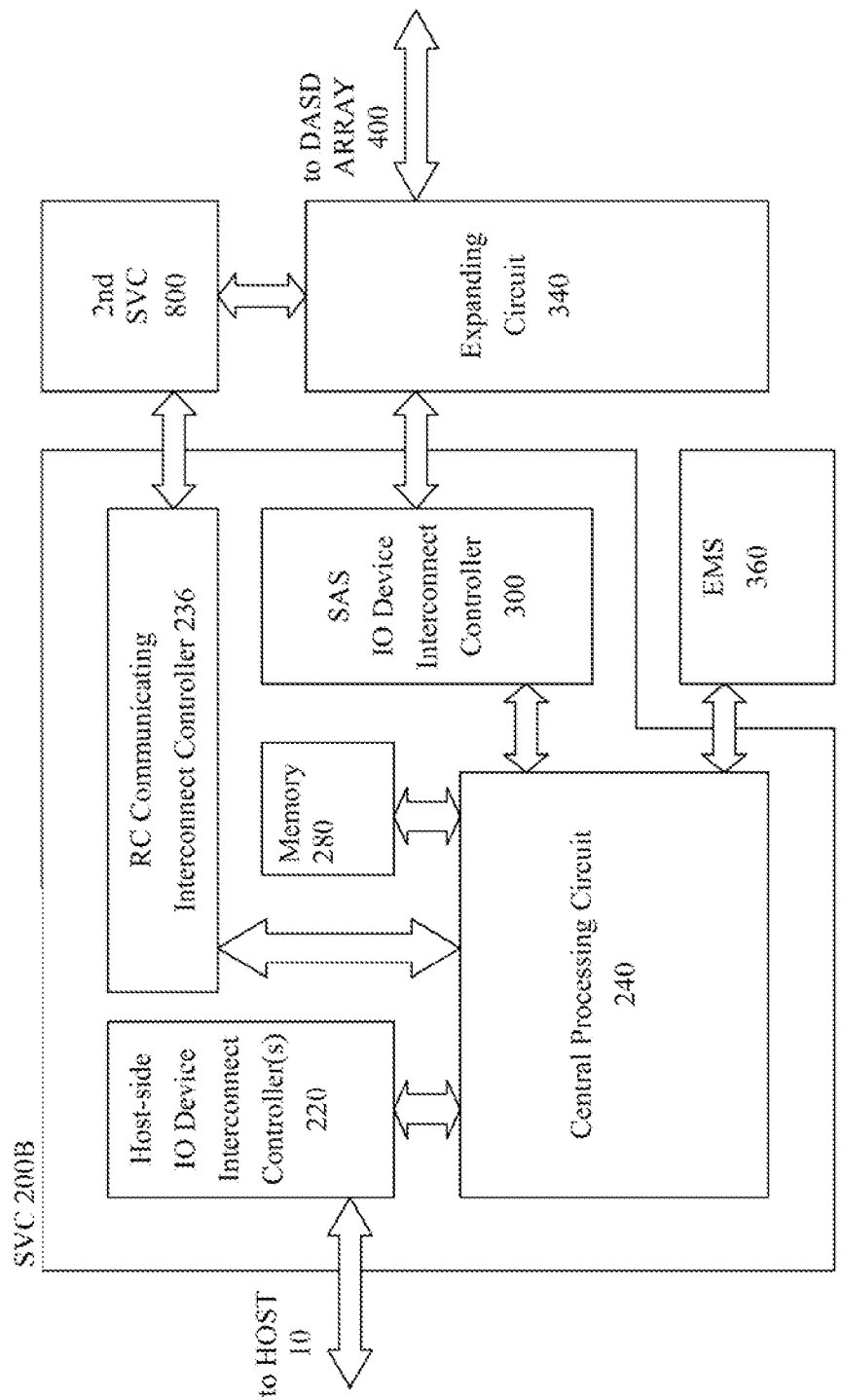
FIG. 2B is a block diagram showing a second embodiment of an SVC 200 according to the present invention and the connection thereof to the host and the DASD array.

FIG. 2B is a block diagram showing a second embodiment of an SVC 200 according to the present invention and the connecting arrangement thereof to the host and the DASD array 400 through an expanding circuit 340 provided outside the SVC 200. In this embodiment, the SVC 200B comprises a host-side IO device interconnect controller 220, a CPC 240, a memory 280, a SAS IO device interconnect controller 300, and a redundant controller communicating (RCC) interconnect controller 236. Although illustrated in separate functional blocks, some or all of these functional blocks can be incorporated into to one chip.

Comparing with SVC 200A, in this embodiment, the RCC interconnect controller 236 is implemented in SVC 200B to connect the CPC 240 to a second SVC 800. In addition, the SAS IO device interconnect controller 300 is connected to the DASD array 400 through the expanding circuit 340. The expanding circuit 340 is also connected to the second SVC 800. In this arrangement, a redundant second SVC 800 can be attached to the SVC 200B. The DASD array 400 can be accessed by the two SVCs 200B and 800, through the expanding circuit 340. Moreover, the control/data information from the host 10 can be transferred from the CPC 240 through the RCC interconnect controller 236 to the SVC 800, and further to a second DASD array (not shown) if required. Since there are more than one SVC, an SATA multiplexing circuit 460 is provided between the SVCs and the SATA DASD 420S as a port selector when more than one SVC are connected to the SATA DASD 420S. This will occur when, for example, the SVCs 200 and 800 are configured into a redundant SVC pair in a SVS including the SATA DASD 420S.

Figure 10:
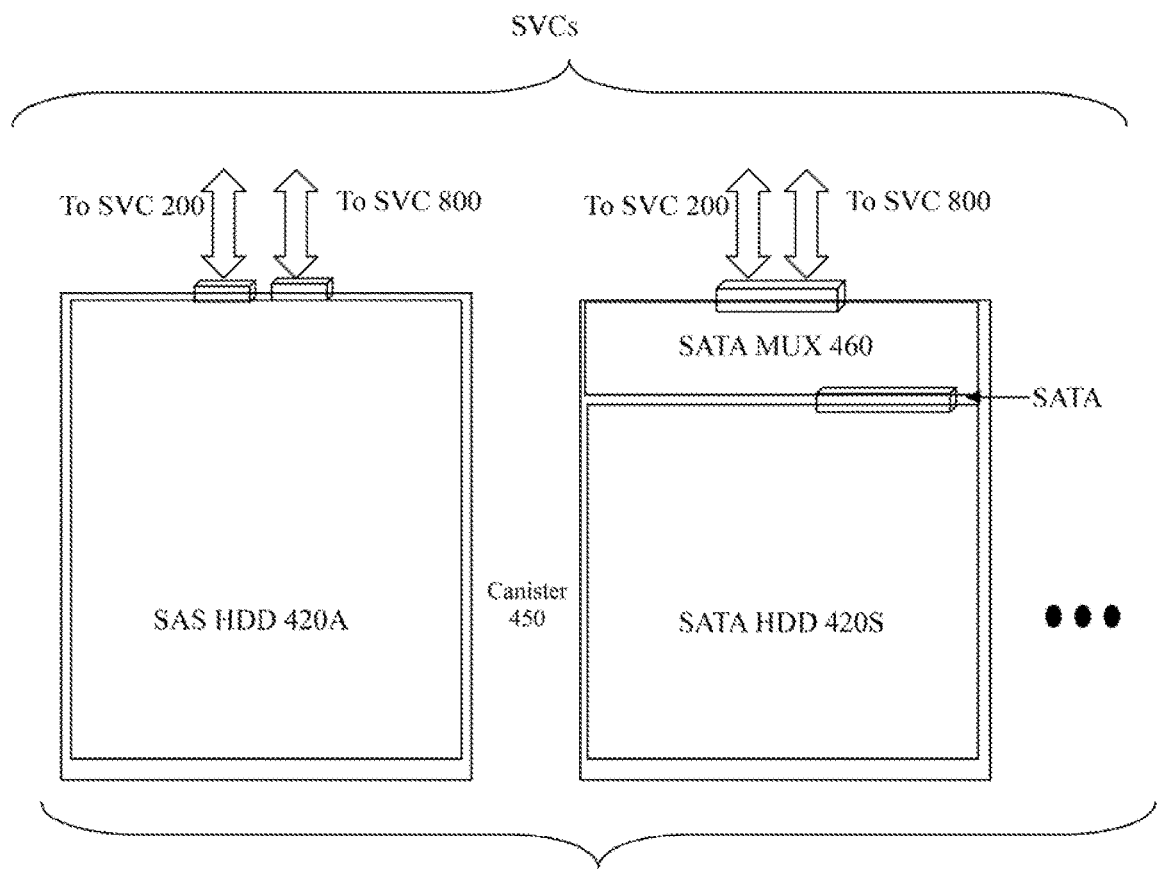
FIG. 10 exemplifies connection structure between the SVC and the DASD array.

FIG. 10 exemplifies a connecting arrangement of DASDs to the SVCs 200 and 800, in which more than one type of DASDs, such as SATA HDD 420S and SAS HDD 420A, are provided in the DASD array 400. In the present example, the DASD 420 comprises a SAS hard disk drive (HDD) 420A and a SATA hard disk drive 420S. Due to the compatibility of the SAS protocol to a SATA HDD, the single port SATA HDD 420S can be connected to the SVCs via a SATA MUX 460. The DASD 420 could be contained in a removable canister 450. The removable canister allows the DASD 420 and any related circuitry to be easily swapped out in the event of that a DASD 420 and/or related circuitry needs servicing. By placing the conversion circuit in the canister the entire canister contents of the DASD, for example, SATA DASD, could be swapped out with another kind of DASD, for example, a PATA DASD related circuitry.

Figure 11B:
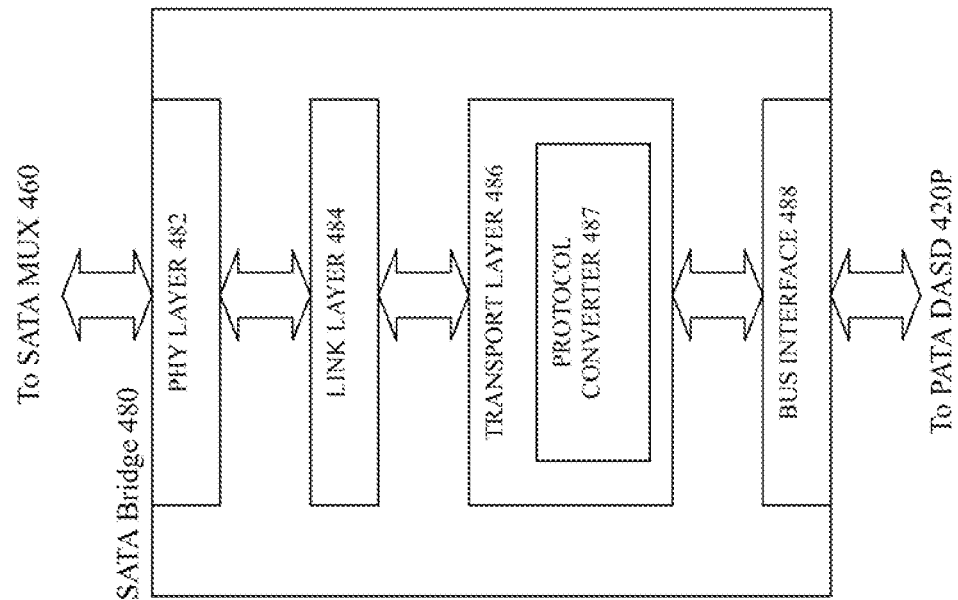
FIG. 11A-11B disclose the details of the multiplexer and bridge between SVC and DASD array shown in FIG. 10.
Figure 11A:
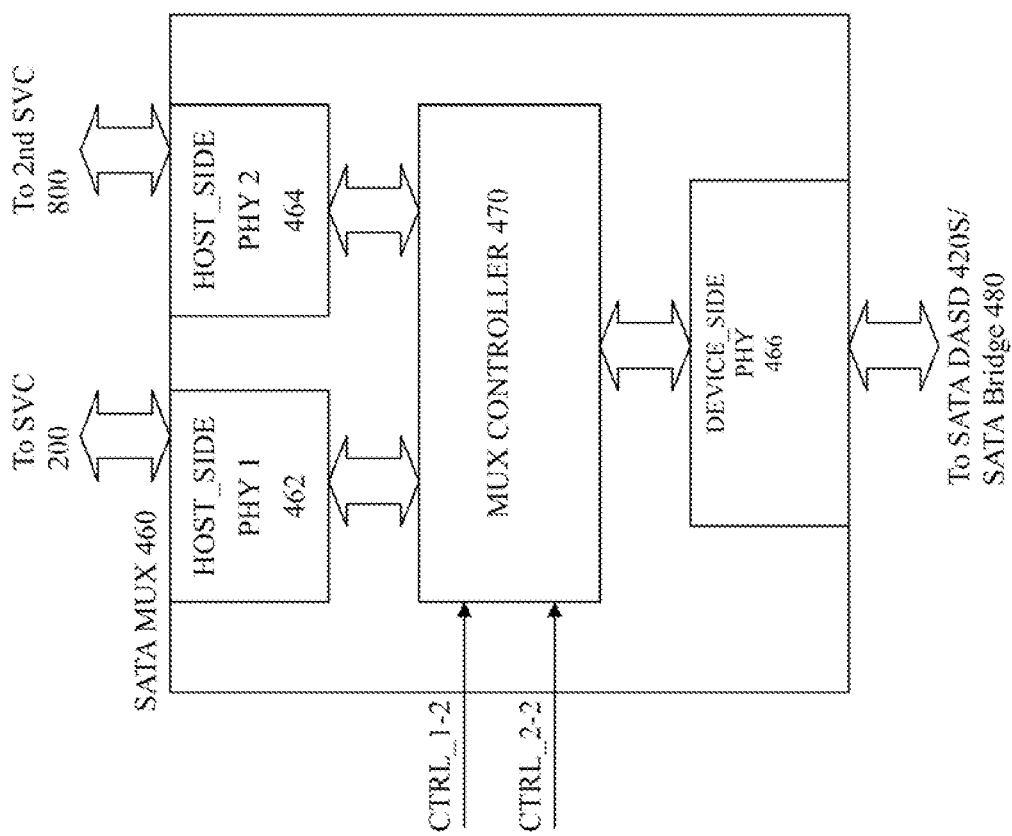

FIG. 11A discloses an example of the SATA multiplexing circuit 460. The data in the SATA format from the SVC 200 is received by the host-side PHY1 462 and the data in the SATA format from the second SVC 800 is received by the host-side PHY2 464. The Mux controller 470 determines which of the SVCs 200 and 800 has the access to the DASD 420S through the device-side PHY 466 under the control of control signals CTRL_1-2 and CTRL_2-2 from the SVCs 200 and 800, respectively. According to SATA2 protocol, however, the control signals CTRL_1-2 and CTRL_2-2 can be omitted. In a further embodiment, the DASD 420P can be a PATA HDD 420P, and there is a bridge 480 provided between the SATA multiplexing circuit 460 and the PATA HDD 420P to convert the SATA signals into PATA signals which can be received and handled by the PATA HDD controller. FIG. 11B disclose an example of the bridge 480. The data signals from SATA mux 460 is received by the PHY layer 482, and are transferred to transport layer 486 through link layer 484. The signals in SATA format are than converted by the protocol converter 487 to comply with the format of Parallel ATA and then transferred to the PATA SASD 420P through the bus interface 488.

The RCC interconnect controller 236 can be integrated with the host-side IO device interconnect controller 220 as a single-chip IC, which comprises a plurality of IO ports including one or more host-side ports and one or more device-side ports. Alternatively, the RCC interconnect controller 236 can be integrated with the device-side IO device interconnect controller 300 as a single-chip IC. Furthermore, the host-side IO device interconnect controller 220, the device-side IO device interconnect controller 300, and the RCC interconnect controller 236 can all be integrated as a single-chip IC. In such an implementation, the single-chip IO device interconnect controller may comprise IO ports for using as host-side port(s), device-side port(s), and IO ports for connecting between the SVCs 200 and 800.

Figure 2C:
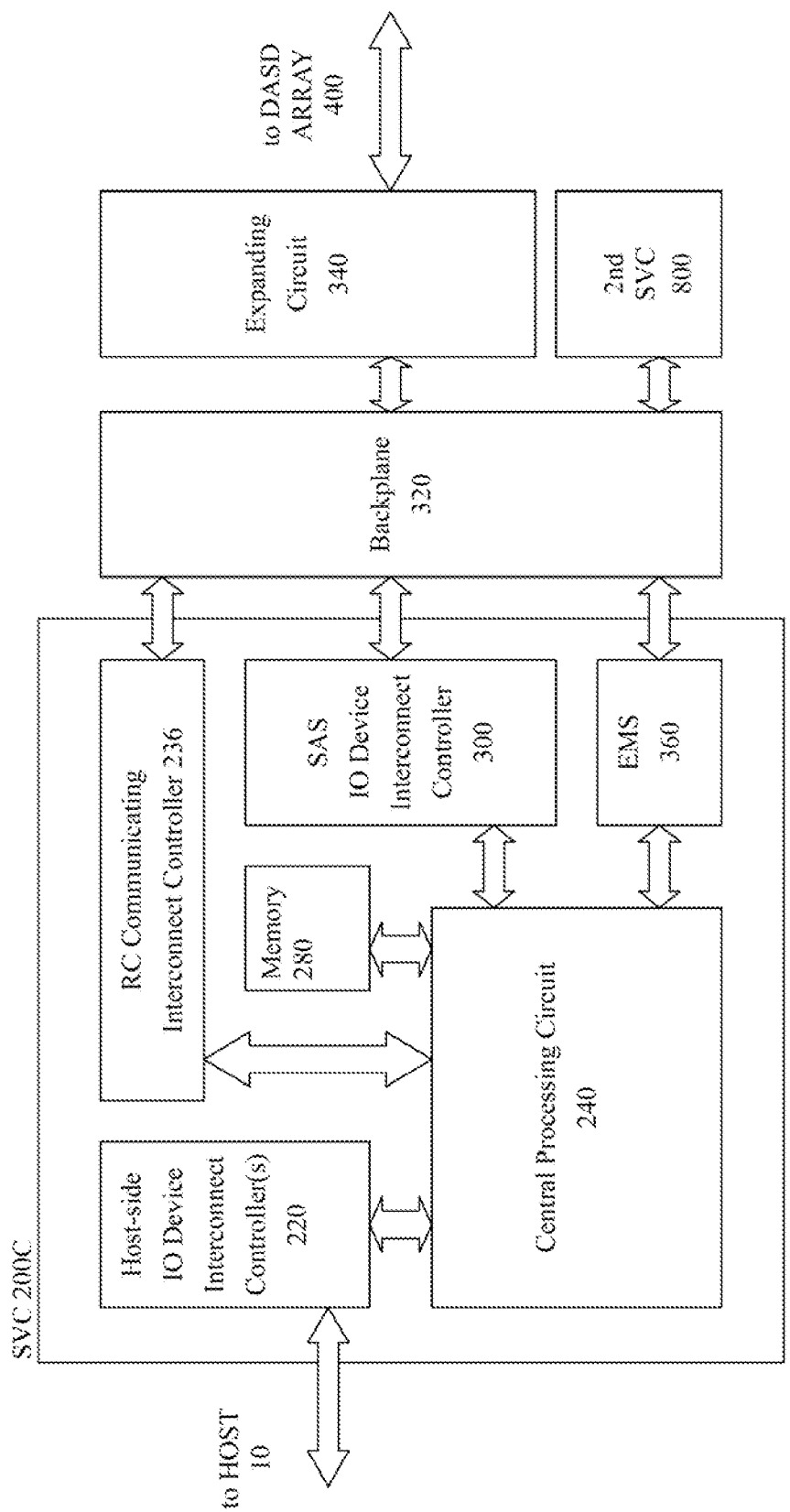
FIG. 2C is a block diagram showing a third embodiment of an SVC 200 according to the present invention and the connection thereof to the host and the DASD array.
Figure 3B:
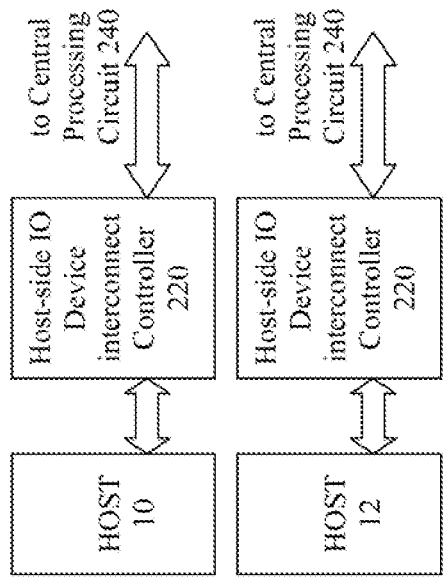
FIGS. 3A through 3D show various block diagrams exemplifying the connecting arrangement between the host(s)/a redundant SVC, the host-side IO device interconnect controller, and the CPC according to the present invention.
Figure 3A:
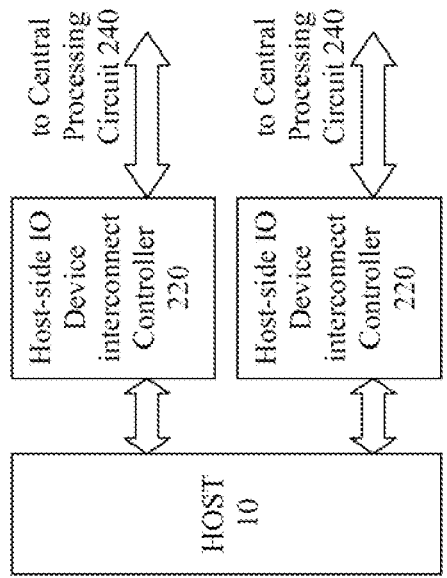
Figure 3D:
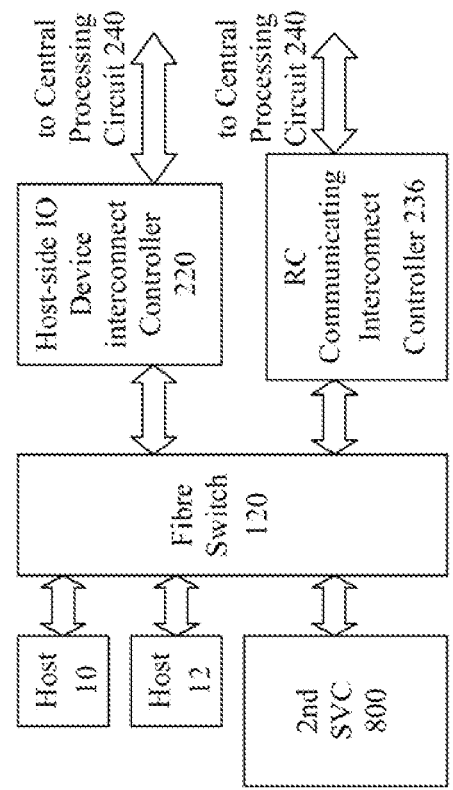
Figure 3C:
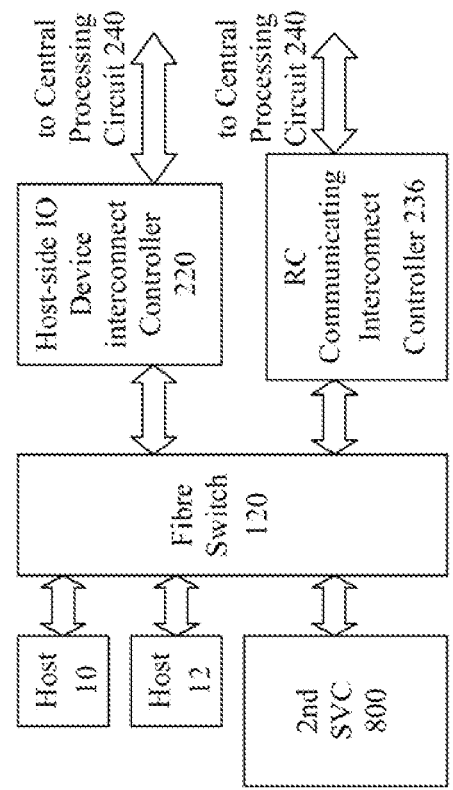

FIG. 2C is a block diagram showing a third embodiment of an SVC 200 according to the present invention and the connection thereof to the host and the DASD array through a backplane 320 and an expanding circuit 340. In this embodiment, the SVC 200B comprises a host-side IO device interconnect controller 220, a CPC 240, a memory 280, a SAS (Serial Attached SCSI) IO device interconnect controller 300, an EMS 360 and a redundant controller communicating (RCC) interconnect controller 236. Although illustrated in separate functional blocks, some or all of these functional blocks can be incorporated into to one chip.

Comparing with SVC 200B, in the SVC 200C, the SAS IO device interconnect controller 300 is connected through the backplane 320 to the switching circuit 340, and then to the DASD array 400. The backplane 320 is a circuit board, e.g., a printed circuit board, having connecting wiring provided therein for connecting between the SVC 200C and the expanding circuit 340 to make the connecting more robust and facilitate the attaching and removing of the SVCs and/or the DASD. In the arrangement shown in FIG. 2B, the physical electrical connection between the SAS IO device interconnect controller 300 and the expanding circuit 340 is, for example, a cable, which is not so robust as the backplane circuit board 320. In addition, the EMS circuit 360 is provided in the SVC 200 rather than outside the SVC 200.

In this arrangement, the physical electrical connection between the RCC interconnect controller 236 and the second SVC 800 is provided in the backplane 320.

In the embodiments of FIG. 2A-2C, the host-side IO device interconnect controller 220 and the device-side IO device interconnect controller 300 (SAS IO device interconnect controller 300) could be implemented with the same kind of IC chip, with IO device interconnect ports in the host-side IO device interconnect controller 220 configured as host-side IO device interconnect ports and with IO device interconnect ports in the device-side IO device interconnect controller 300 configured as device-side IO device interconnect ports. Alternately, a single chip could be configured to contain both host-side IO device interconnect ports and device-side IO device interconnect ports for, respectively, coupling to the host entity 10 and the PSD array 400 concurrently. Furthermore, a single chip could be configured to contain all the host-side IO device interconnect ports for coupling to the host entity 10, the device-side IO device interconnect ports for coupling to the PSD array 400, and ports for coupling to SVC 800, respectively but concurrently.

Alternatively, the EMS circuit 360 can be incorporated into CPC 240. Moreover, the EMS 360 can be implemented in the SAS IO device interconnect controller 300 as well.

FIGS. 3A through 3D show various block diagrams exemplifying the connecting arrangement between the host (s) and redundant SVC, the host-side IO device interconnect controller 220, and the CPC according to the present invention. In a first embodiment shown in FIG. 3A, a host 10 is connected through separate ports with two host-side IO device interconnect controllers 220, both connecting to the same CPC 240. In a second embodiment shown in FIG. 3B, two separate hosts 10 and 12 are each connected to a separate host-side IO device interconnect controllers 220, both connecting to the same CPC 240. In a third embodiment shown in FIG. 3C, a host 10 is connected to a host-side IO device interconnect controllers 220 and then to the CPC 240, while a second SVC 800 is connected to a RCC interconnect controller 236 and then to the same CPC 240. In a fourth embodiment shown in FIG. 3D, a fibre-to-SAS SVS architecture is disclosed. Two separate hosts 10 and 12 and a SVC 800 are each connected to a fibre switch 120, and a host-side IO device interconnect controller 220 and a RCC interconnect controller 236 are connected to the fibre switch 120. The host-side IO device interconnect controller 220 and the RCC interconnect controller 236 are connected to the same CPC 240. The switch can be implemented with a multiplexer. When the host-side IO device interconnect controller 220 is implemented to have a SAS port therein for connecting with the host port of the host entity, it is similar to the SAS port provided in the device-side IO device interconnect controller 300, but configured in target mode rather than in initiator mode.

Figure 4:
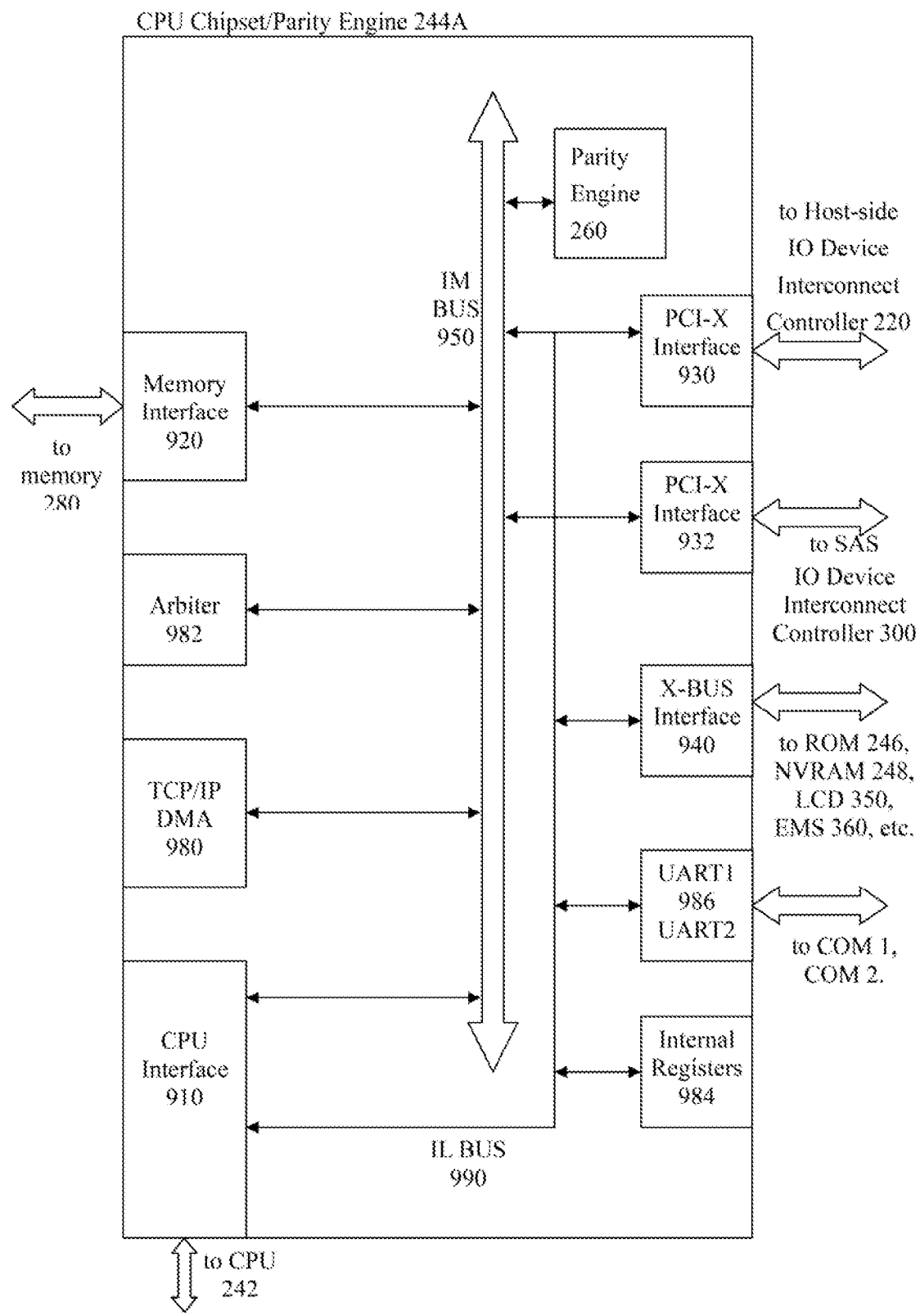
FIG. 4 is a block diagram illustrating an embodiment of the CPU chipset/parity engine according to the present invention.

FIG. 4 is a block diagram illustrating an embodiment of the CPU chipset/parity engine 244 according to the present invention. In the present embodiment, the CPU chipset/parity engine 244A mainly comprises parity engine 260, CPU interface 910, memory controller 920, PCI-X interfaces 930, 932, X-BUS interface 940, TCP/IP DMA 980, Arbiter 982, IM BUS (Internal Main BUS) 950, and IL Bus (Internal Local Bus) 990. The IM BUS 950 is, for example, a 128-bit, 133 Mhz bus and connects the parity engine 260, CPU interface 910, memory controller 920, PCI-X interfaces 930, 932, X-BUS interface 940 altogether for communicating data signal and control signal among them.

Data and control signals from host-side IO device interconnect controller 220 enter CPU chip/parity engine 244A through PCI-X interface 930. The PCI-X interface 930 to the host-side IO device interconnect controller 220 can be, for example, of a bandwidth of 64-bit, 133 Mhz. When the PCI-X interface 930 owns the IM bus 950, the data and control signals are then transmitted to either the memory controller 920 or to the CPU interface 910.

The data and control signals received by the CPU interface 910 from IM bus 950 are transmitted to CPU 242 for further treatment. The communication between the CPU interface 910 and the CPU 242 can be performed, for example, through a 64 bit data line and a 32 bit address line. The data and control signals can be transmitted to the memory controller 920 of a bandwidth of 64 bit, 133 MHz.

An ECC (Error Correction Code) circuit is also provided in the memory controller 920 to generate ECC code. The ECC code can be generated, for example, by XORing 8 bits of data for a bit of ECC code. The memory controller 920 then stores the data and ECC code to the memory 280, for example, an SDRAM. The data in the memory 280 is transmitted to IM bus 950. The memory controller 920 has the functionality of one-bit auto-correcting and multi-bit error detecting and such functionality is performed on the data when the data is transmitted from the memory 280 to IM bus 950.

The parity engine 260 can perform parity functionality of a certain RAID level in response to the instruction of the CPU 242. Of course, the parity engine 260 can be shut off and perform no parity functionality at all in some situation, for example, in a RAID level 0 case. A internal local bus 990 will connect the CPU interface 910 and other low speed device interface.

The internal registers 984 are provided to register status of CPU chipset/parity engine 244A and for controlling the traffic on the IM bus 950. In addition, a pair of UART functionality blocks 986 are provided so that CPU chipset/parity engine 244A can communicate with outside through RS232 interface.

The TCP/IP DMA block 980 will provide the function of checksum calculation and DMA operation. The arbiter 982 will arbitrate the usage of IM bus 950.

In an alternative embodiment, PCI-E interfaces can be used in place of the PCI-X interfaces 930, 932. In another alternative embodiment, PCI interfaces can be used in place of the PCI-X interfaces 930, 932. Those skilled in the art will know such replacement can be easily accomplished without any difficulty.

Figure 5A:
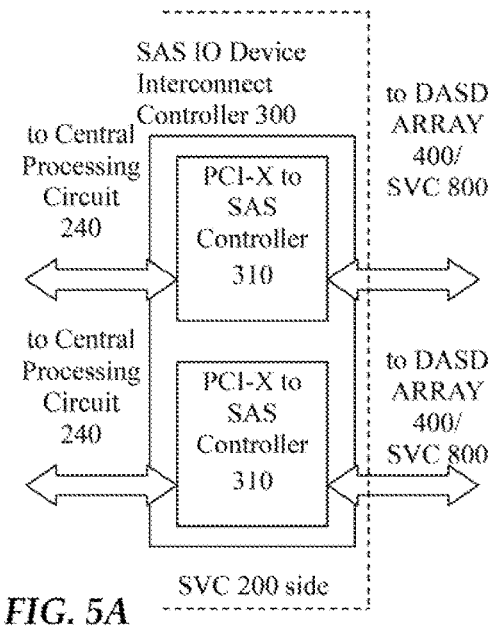
FIG. 5A is a block diagram illustrating a first embodiment of the SAS IO device interconnect controller used in FIG. 2A.

FIG. 5A is a block diagram illustrating a first embodiment of the SAS IO device interconnect controller 300 used in FIG. 2A. According to the present embodiment, the SAS IO device interconnect controller 300 comprises two PCI-X to SAS controller 310.

Figure 6A:
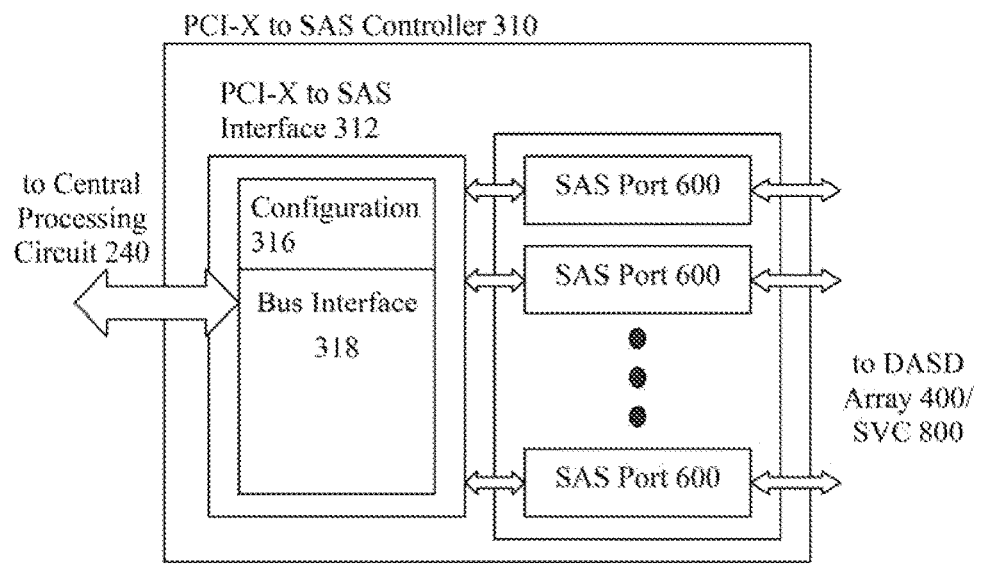
FIG. 6A is a block diagram illustrating an embodiment of the PCI-X to SAS controller 310.

FIG. 6A is a block diagram illustrating an embodiment of the PCI-X to SAS controller 310 of FIG. 5A. As shown in FIG. 6A, each PCI-X to SAS controller 310 contains a PCI-X interface 312 connected to the CPC 240 and the SAS ports 600 connected to the PCI-X interface 312. The PCI-X interface 312 comprises a bus interface 318 connecting to SAS ports 600 and a configuration circuitry 316 storing the configuration of the PCI-X to SAS controller 310. The SAS port 600 can be connected to the DASD array 400 and/or the SVC 800.

Figure 8A:
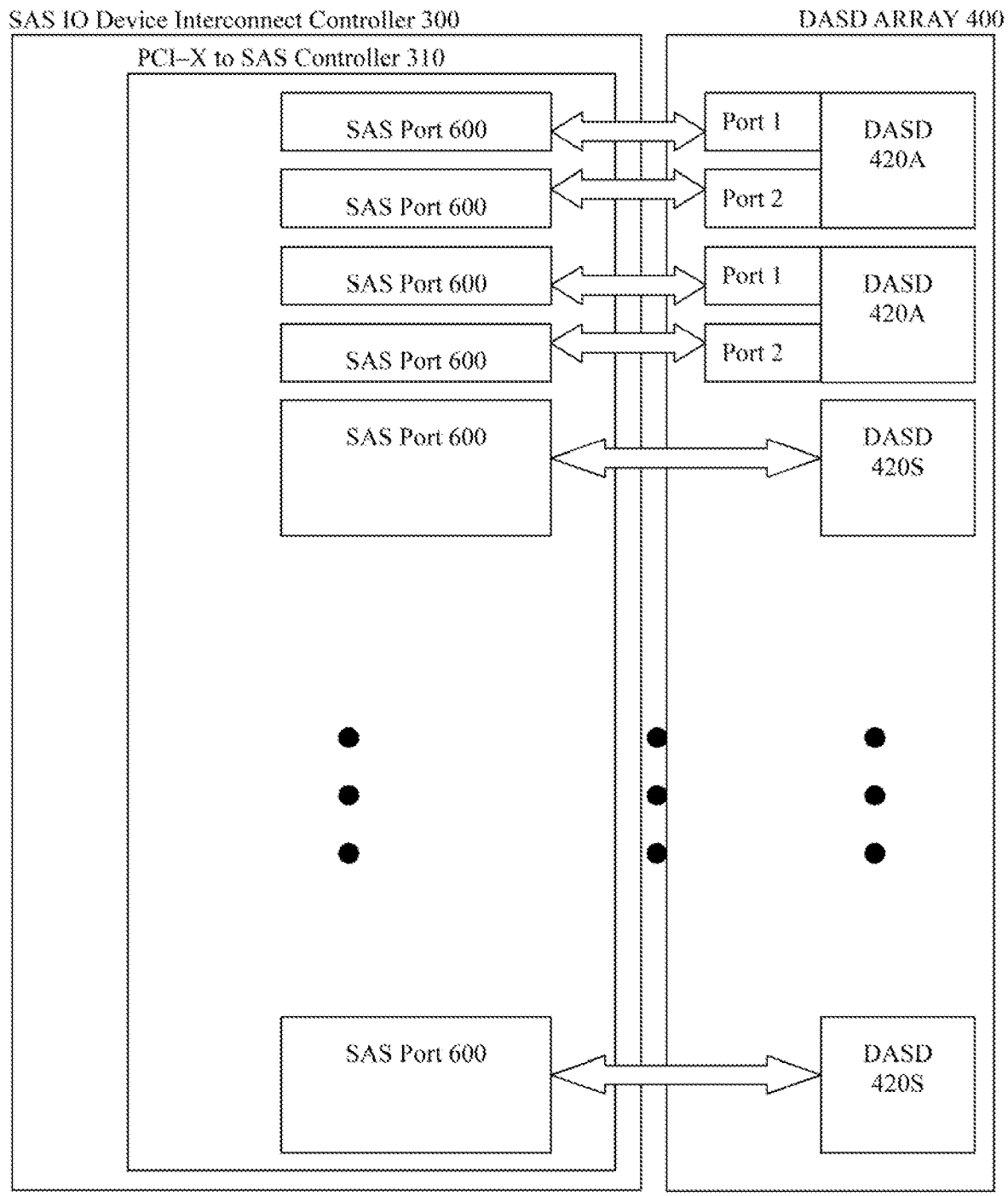
FIG. 8A is a block diagram illustrating in more detail the connection between SAS IO Device Interconnect Controller 300 and DASD array 400 in FIG. 2A.

FIG. 8A is a block diagram illustrating in more detail the connection between SAS IO Device Interconnect Controller 300 and DASD array 400 in FIG. 2A. Through a SAS port 600 of the PCI-X to SAS Controller 310, the data and control signals are transmitted to the DASD 420. The SAS port 600 can be directly connected to either a SAS port of a SAS DASD 420A or a SATA port of a SATA DASD 420S. In addition, since there are two separate ports, port 1 and port 2, on each SAS DASD 420A, two different SAS ports on the PCI-X to SAS controller 310 (or even on different PCI-X to SAS controllers 310, which is not shown in FIG. 8A) can be connected to a SAS DASD 420A through two different ports, which forms for a single SAS DASD 420A a redundant port pair having redundant interconnects to the SVC 200.

In an alternative embodiment, a PCI-Express (PCI-E for short) to SATA controller (not shown) can be used in place of the PCI-X to SATA controller 310. In the PCI-E to SATA controller, a PCI-E interface (not shown) is used in place of the PCI-X interface 312. In another alternative embodiment, a PCI to SATA controller can be used in place of the PCI-X to SATA controller 310. In the PCI to SATA controller, a PCI interface is used in place of the PCI-X interface 312. Those skilled in the art will know such replacement can be easily accomplished without any difficulty.

Figure 6B:
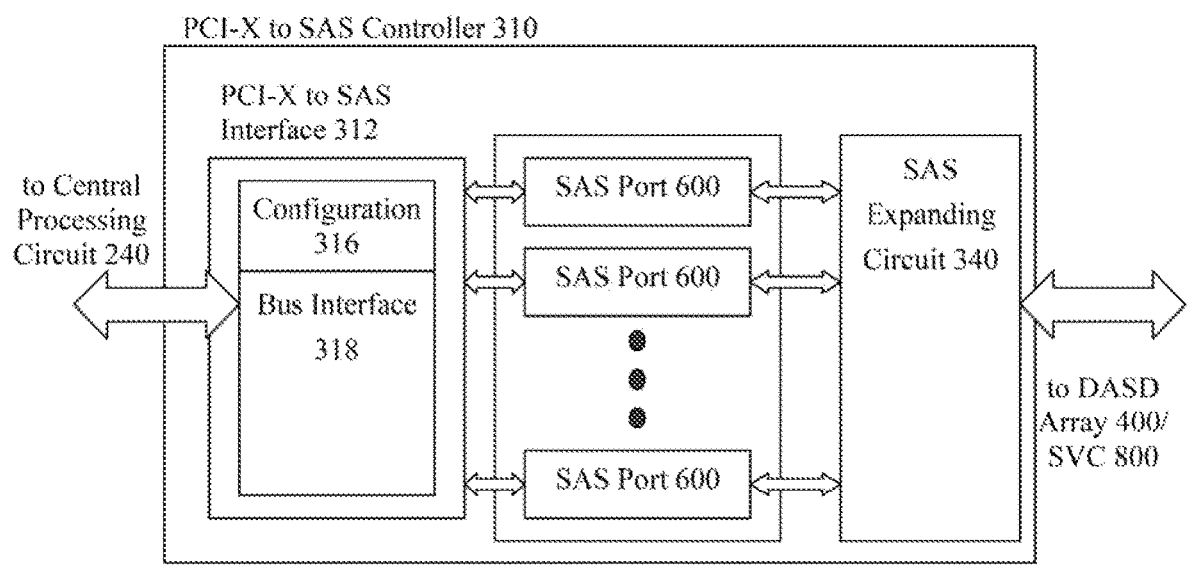
FIG. 6B is a block diagram illustrating a second embodiment of the PCI-X to SAS controller 310.
Figure 6C:
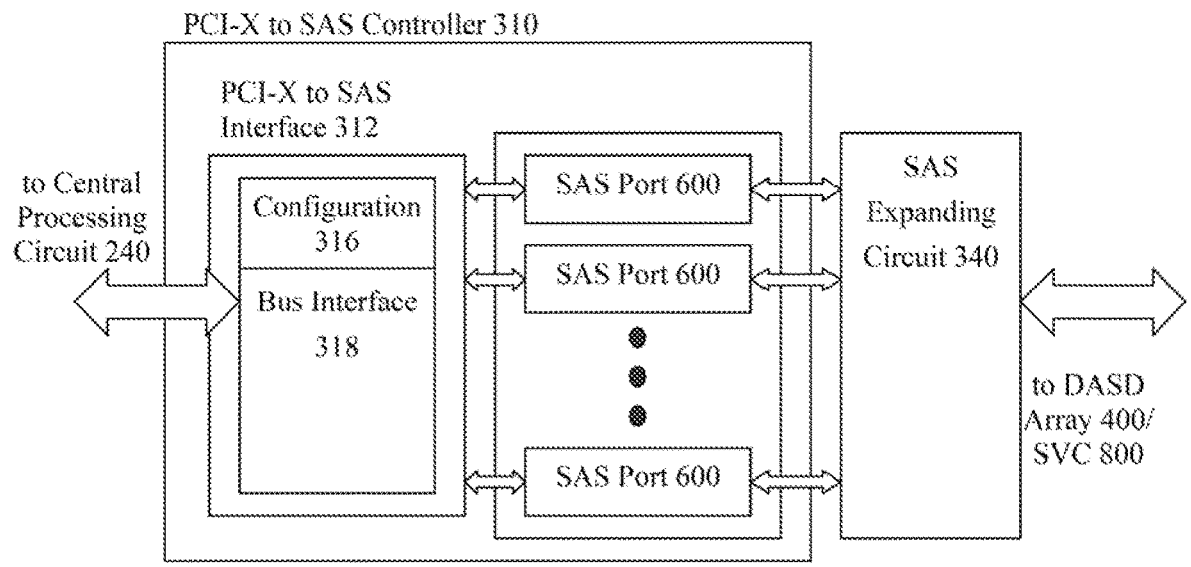
FIG. 6C is a block diagram illustrating a first implementation of connecting arrangement of the DASD array 400 to the PCI-X to SAS controller 310 of FIG. 6A.

FIG. 6B is a block diagram illustrating a second embodiment of the PCI-X to SAS controller 310 of FIG. 5A, which comprises a SAS expanding circuit 340 incorporated therein. A SAS expanding circuit 340 can be implemented as an edge expander device 315, as shown in FIG. 6E, which can connect to another one or two edge expander device and/or a plurality of end devices, such as SAS ports of one or more DASDs 420. Also, a SAS expanding circuit 340 can be implemented to contain one or more edge expander device sets each comprising a plurality of edge expander devices 315. In addition, a SAS expanding circuit 340 can be implemented as a fanout expander device containing a plurality of edge expander device sets each containing a plurality of edge expander devices 315.

The SAS expander device 315 comprises an expander connection block, a management function block, and a plurality Phy. The expander connection block provides the multiplexing functionality to connect each PHY for signal input and output. The management function block performs the SMP operation of of expander. Through the expander device 315, a plurality of DASDs can be connected to a SAS controller 310, which improves the scalability of the storage volume of the SVS, while through the fanout expander device, a lot of edge expander device sets can be attached thereto, which largely enhances the volume scalability of the SVS.

Figure 6D:
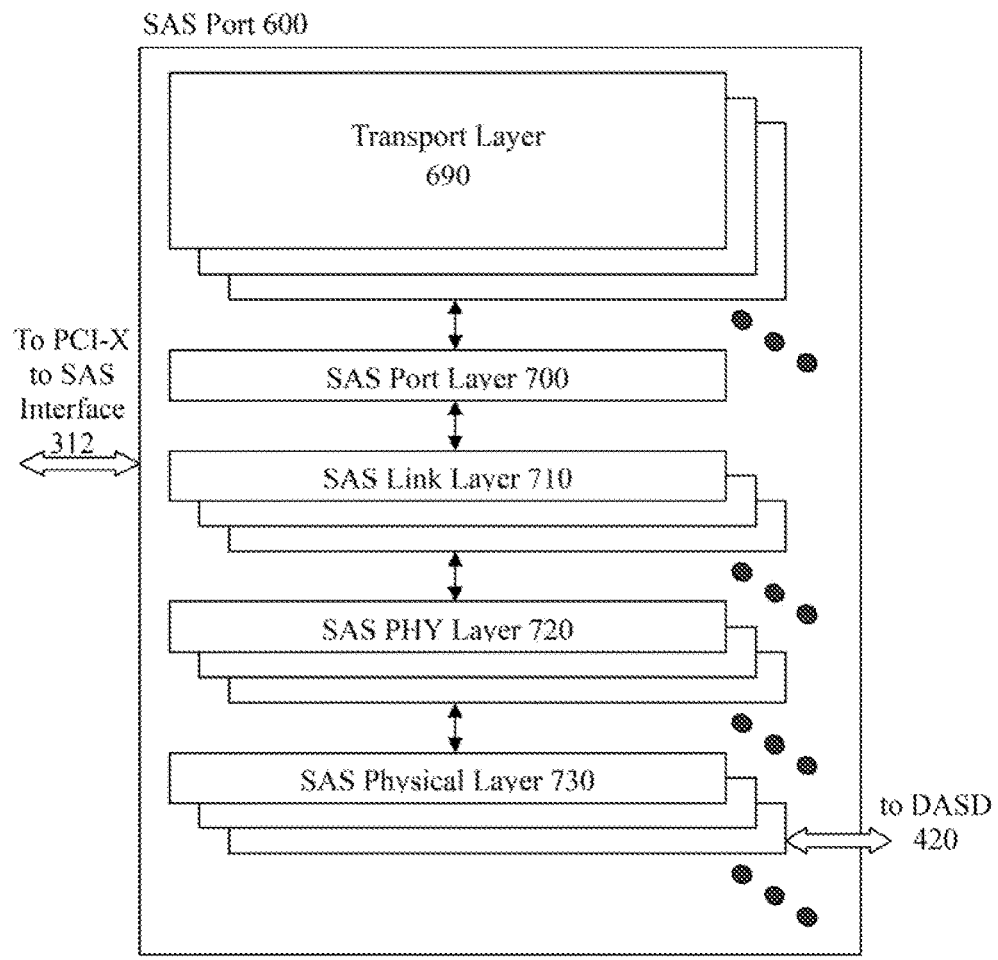
FIG. 6D is a block diagram illustrating an embodiment of the SAS port of FIG. 6A/6B/6C.
Figure 6E:
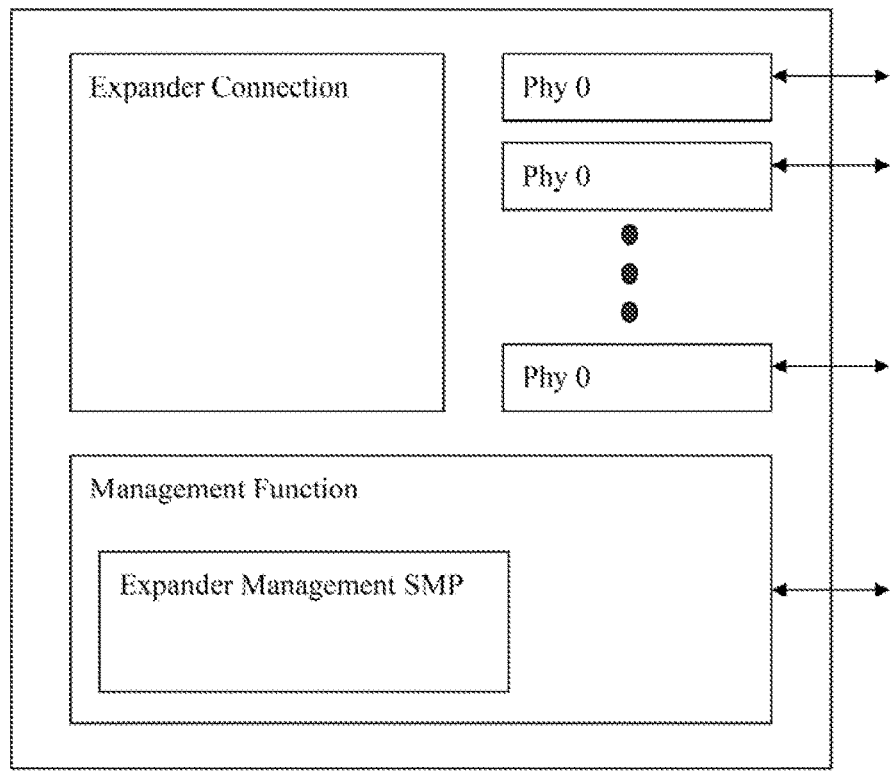
FIG. 6E is a block diagram illustrating an embodiment of the SAS expander device 315 used in the SAS expanding circuit 340 of FIG. 6B/6C.

FIG. 6D is a block diagram illustrating an embodiment of the SAS port 600 of FIG. 6A/6B. As shown in FIG. 6D, the SAS port comprises five parts: the transport layer 690, SAS port layer 700, SAS linker layer 710, SAS PHY layer 720, and SAS physical layer 730. The SAS physical layer 730 includes the SAS connector and cables, and SAS transmitting and receiving circuit. The SAS PHY layer 720 will cover the encoding scheme and the PHY reset sequence including OOB signaling and speed negotiation. The SAS link layer 710 will control the SAS PHY layer to manage connections with other SAS devices. The SAS port layer 700 locates between one or more SAS link layer and one or more SAS transport layers, receives and interprets requests and establishes connections by correct SAS link layers. The SAS transport layer 690 comprises SSP transport layer for serial SCSI application, STP transport layer for SATA application and SMP transport layer for management application.

A SAS port 600 contains one or more phys. It could be a "wide" port if there is more than one phy in the port or be a "narrow" port if there is only one phy. The link between SAS IO device interconnect controller 300 and expanding circuit 340 or DASD array 400 could be narrow link or wide link. A wide link can be configured to link between wide ports at both ends to enlarge the transmission bandwidth.

The physical layer 730 will transmit signals through a pair of differential signal lines, transmission lines LTX+, LTX−, to and receive signals through the other pair of differential signal lines, reception lines LRX+, LRX−, from the DASD controller in the DASD 420. The two signal lines of each pair of the signal lines, for example LTX+/LTX−, transmit signals TX+/TX− simultaneously at inverse voltage, for example, +V/−V or −V/+V, with respective to a reference voltage Vref so that the voltage difference will be +2V or −2V and thus to enhance the signal quality thereof. This is also applicable to the transmission of the reception signals RX+/RX− on reception lines LRX+, LRX−.

The phy layer 720 defines 8b/10b coding and OOB signals. All data bytes received from the physical layer 730 will be decoded the 8b/10b characters and removed the SOF, CR, EOF, A SAS phy 720 uses the OOB signals to identity and start the operational link connected to another SAS phy 720. After SAS link is operational, the SAS phy layer 720 signals the SAS link layer and the SAS link layer assumes control of the SAS phy layer 720 for communication, including identification sequence, connection management and frame transmission. There are two important constructs, SAS primitives and SAS frames used by SAS link layer.

A primitive consists of a single double-word and is the simplest unit of information that may be communicated between a host and a device. When the bytes in a primitive are encoded, the resulting pattern is not easy to be misinterpreted as another primitive or a random pattern. Primitives are used primarily to convey real-time state information, to control the transfer of information and to coordinate communication between the host and the device. The first byte of a primitive is a special character.

A frame consists of a plurality of double-words, and starts with an start primitive and ends with end primitive. The SAS address frame is used when a connection is not established and starts with SOAF (Start of Address Frame) and ends with EOAF (End of Address Frame).

Figure 9:
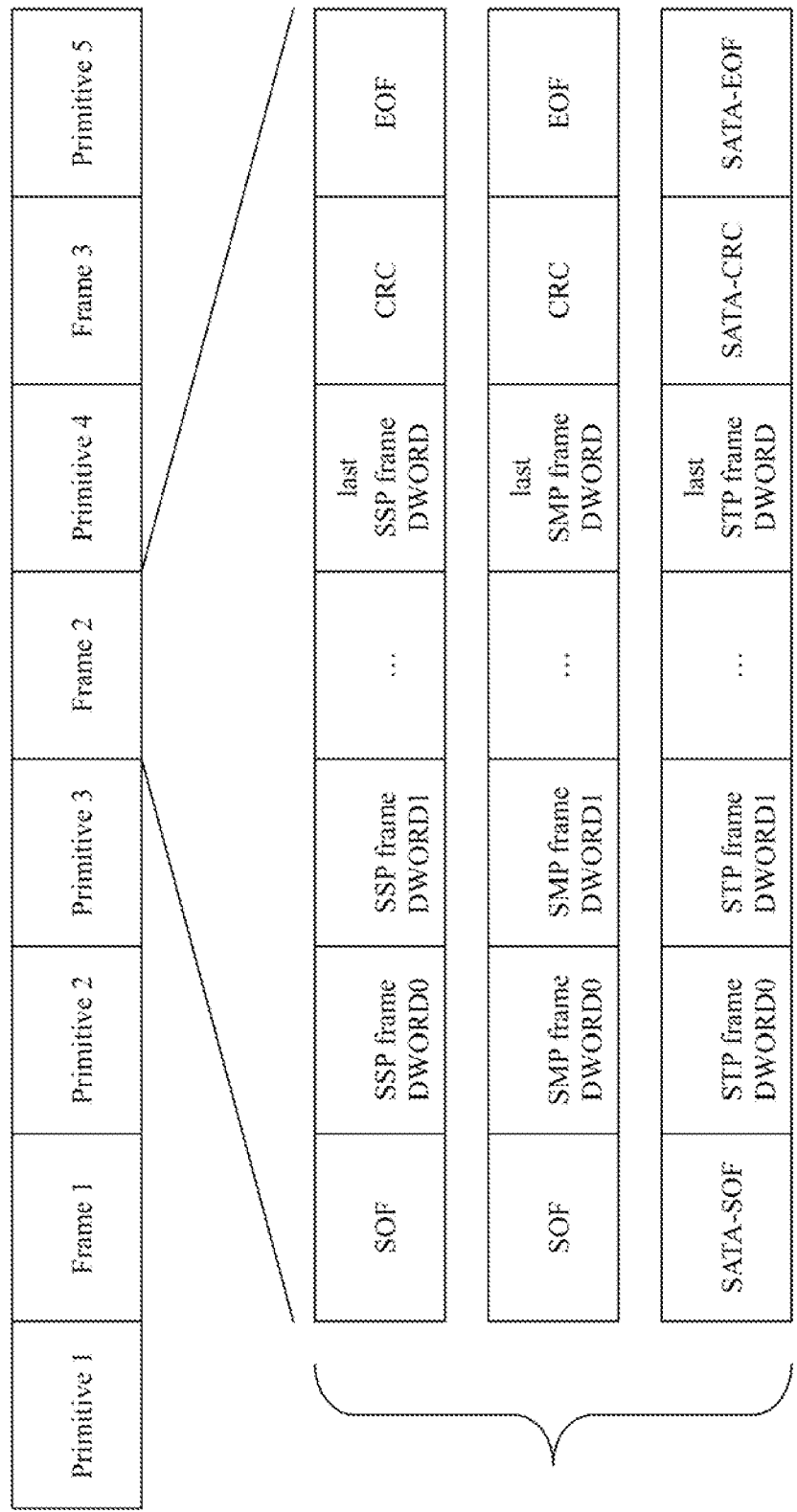
FIG. 9 illustrates a transmission structure complying with SAS protocol.

There are three types of connections supported by the SAS, including SSP frame for SAS device, STP frame for SATA device, and SMP frame for management. SSP frame and SMP frame starts with SOF (Start of Frame) and ends with EOF (End of Frame). STP frame starts with SATA_SOF and ends with STAT_EOF. These frames and a transmission structure complying with SAS protocol are illustrated in FIG. 9.

A CRC (Cyclic-Redundancy Check Code) is the last non-primitive double word immediately preceding the end primitive. CRC code will be calculated over the contents of the frame, all IO request information communicating between CPC 240 and the DASD 420 through the PCI-X to SAS Controller 310 will perform CRC checking. Hence, inadvertent data corruption (e.g., due to noise) during the transfer from SVC to PSD may be detected and recovered, preventing a potential catastrophic data corruption situation in which data gets written to the wrong section of media possibly due to corruption of the destination media section base address and/or media section length that are contained in the initial IO request data.

Figure 6F:
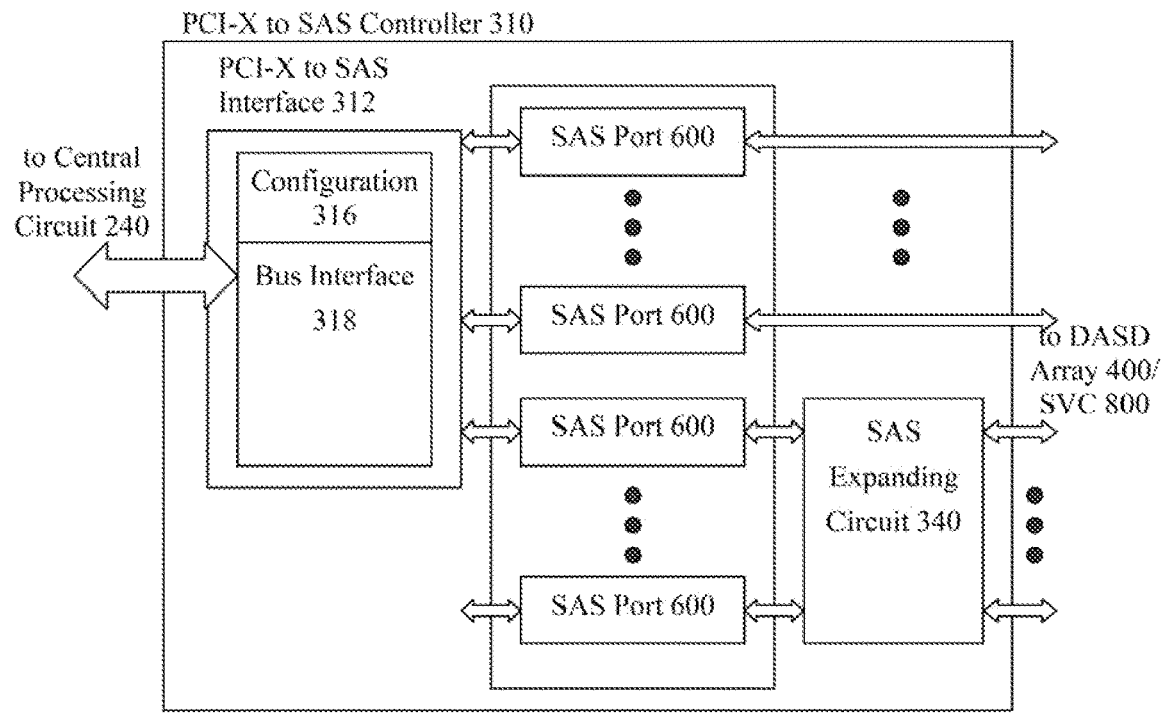
FIG. 6F is a block diagram illustrating a third embodiment of the PCI-X to SAS controller 310.

FIG. 6F is a block diagram illustrating a third embodiment of the PCI-X to SAS controller of FIG. 5A. In this embodiment, some of the SAS ports 600 are connected to the expanding circuit 340 and some of the SAS ports 600 are provided for direct connecting to the DASDs 420, and/or some of the SAS ports 600 are connected to the SVC 800. In addition, the expanding circuit 340 can be further connected to the DASDs 420 and/or the SVC 800.

Figure 5B:
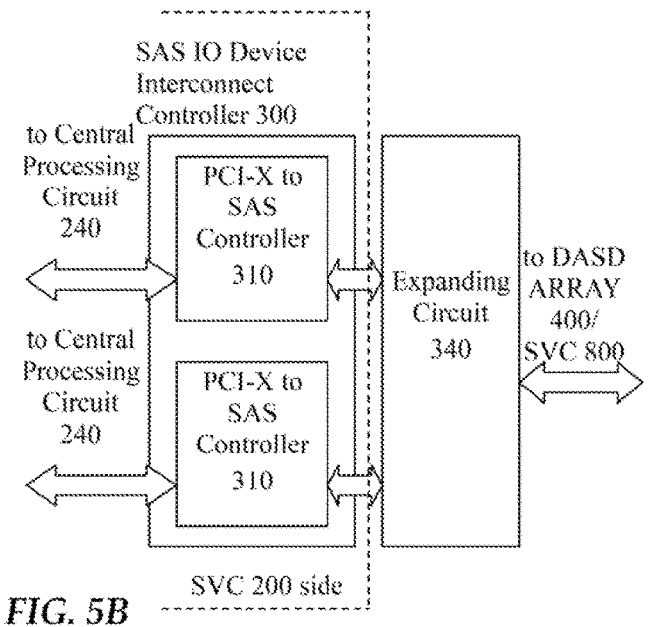
FIG. 5B is a block diagram illustrating a second embodiment of the SAS IO device interconnect controller used in FIG. 2B.

FIG. 5B is a block diagram illustrating a second embodiment of the SAS Controller of FIG. 2B according to the present invention, in which the expanding circuit 340 is provided between the PCI-X to SAS controller 310 and the DASD array 400.

FIG. 6C is a block diagram illustrating a first implementation of connecting arrangement of the DASD array 400 to the PCI-X to SAS controller 310 of FIG. 5B or FIG. 6A, in which the SAS expanding circuit 340 is not provided in the PCI-X to SAS controller 310 but rather provided as a separate device which can be attached to the PCI-X to SAS controller 310 as an interface/controller to the DASD ARRAY 400 or another SAS expanding circuit 340.

Figure 6G:
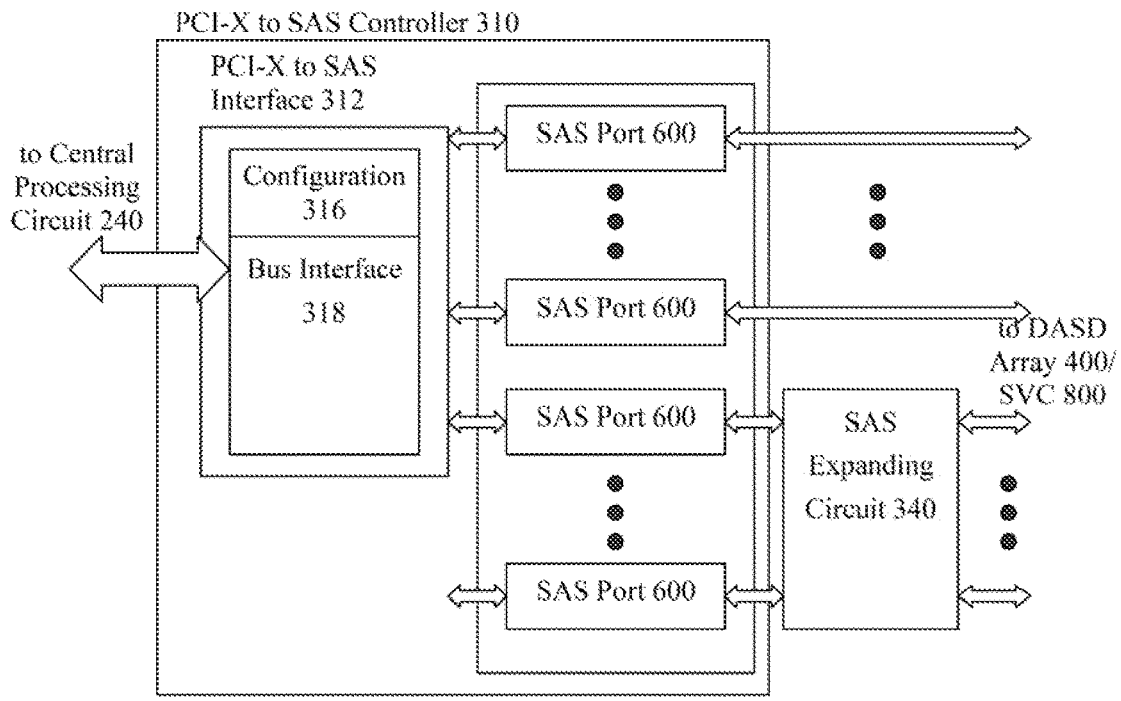
FIG. 6G is a block diagram illustrating a second implementation connecting arrangement of the DASD array 400 to the PCI-X to SAS controller 310 of FIG. 6A.

FIG. 6G is a block diagram illustrating a second implementation of connecting arrangement of the DASD array 400 to the PCI-X to SAS controller 310 of FIG. 5B or FIG. 6A, in which the SAS expanding circuit 340 is not provided in the PCI-X to SAS controller 310 but rather provided as a separate device. In this embodiment, some of the SAS ports 600 are connected to the expanding circuit 340 and some of the SAS ports 600 are provided for direct connecting to the DASDs 420, and/or some of the SAS ports 600 are connected to the SVC 800. In addition, the expanding circuit 340 can be further connected to the DASDs 420 and/or the SVC 800.

Figure 8B:
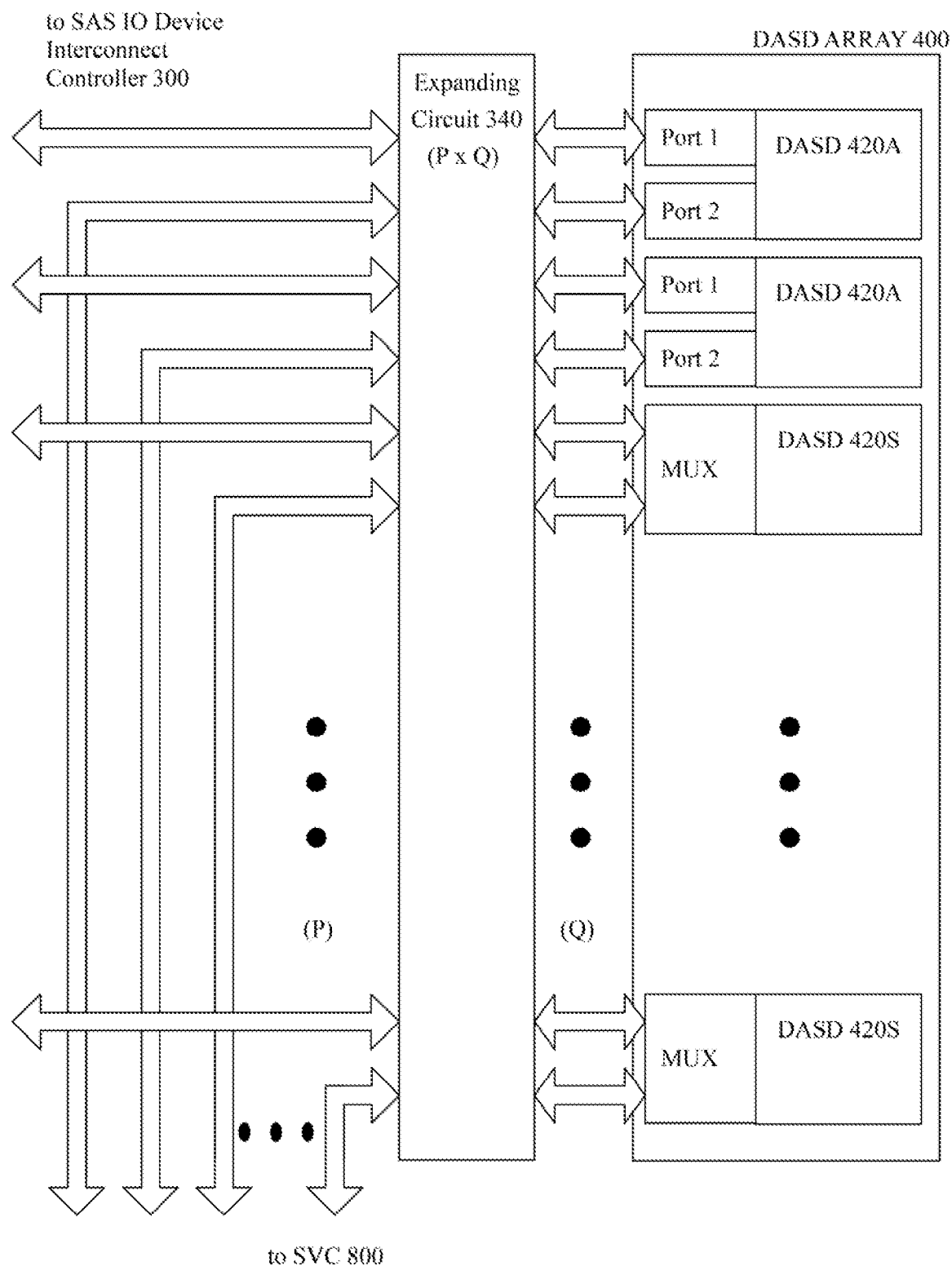
FIG. 8B is a block diagram illustrating in more detail the connecting arrangement between the expanding circuit and other functional blocks in FIG. 2B.

FIG. 8B is a block diagram illustrating in more detail the connection between the expanding circuit 340 and other functional blocks in FIG. 2B and FIG. 5B, or FIGS. 6B/6C/6G. The expanding circuit 340 can receive the command/data from the SAS IO device interconnect controller 300 and transfer them to the DASD array 400 and/or to SVC 800.

Figure 5C:
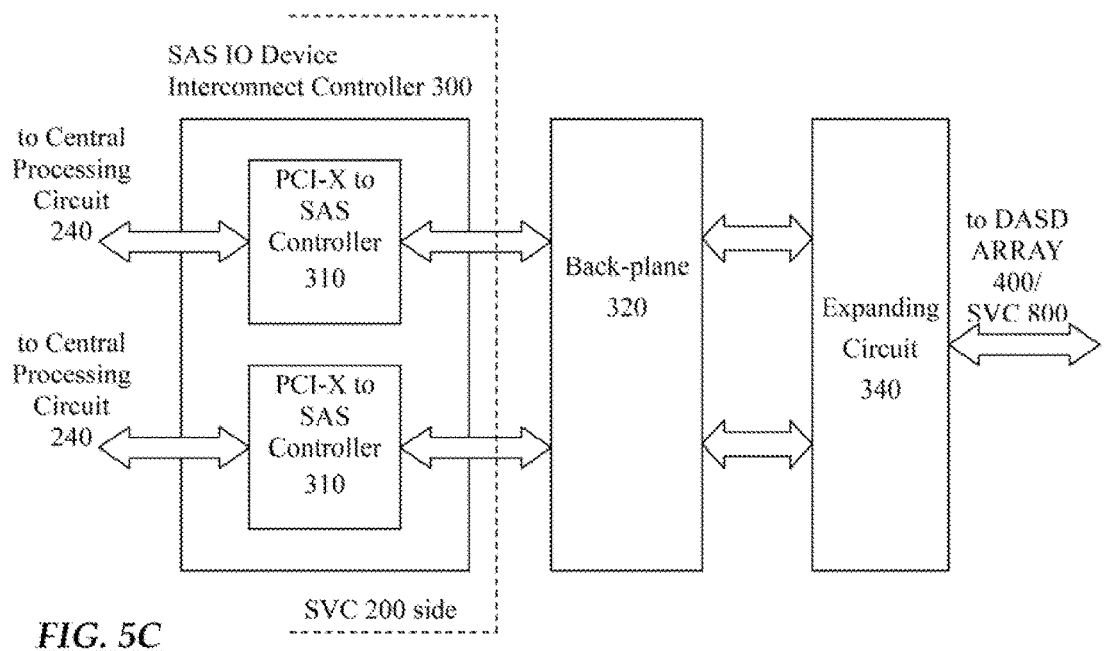
FIG. 5C is a block diagram illustrating a third embodiment of the SAS IO device interconnect controller used in FIG. 2C.
Figure 8C:
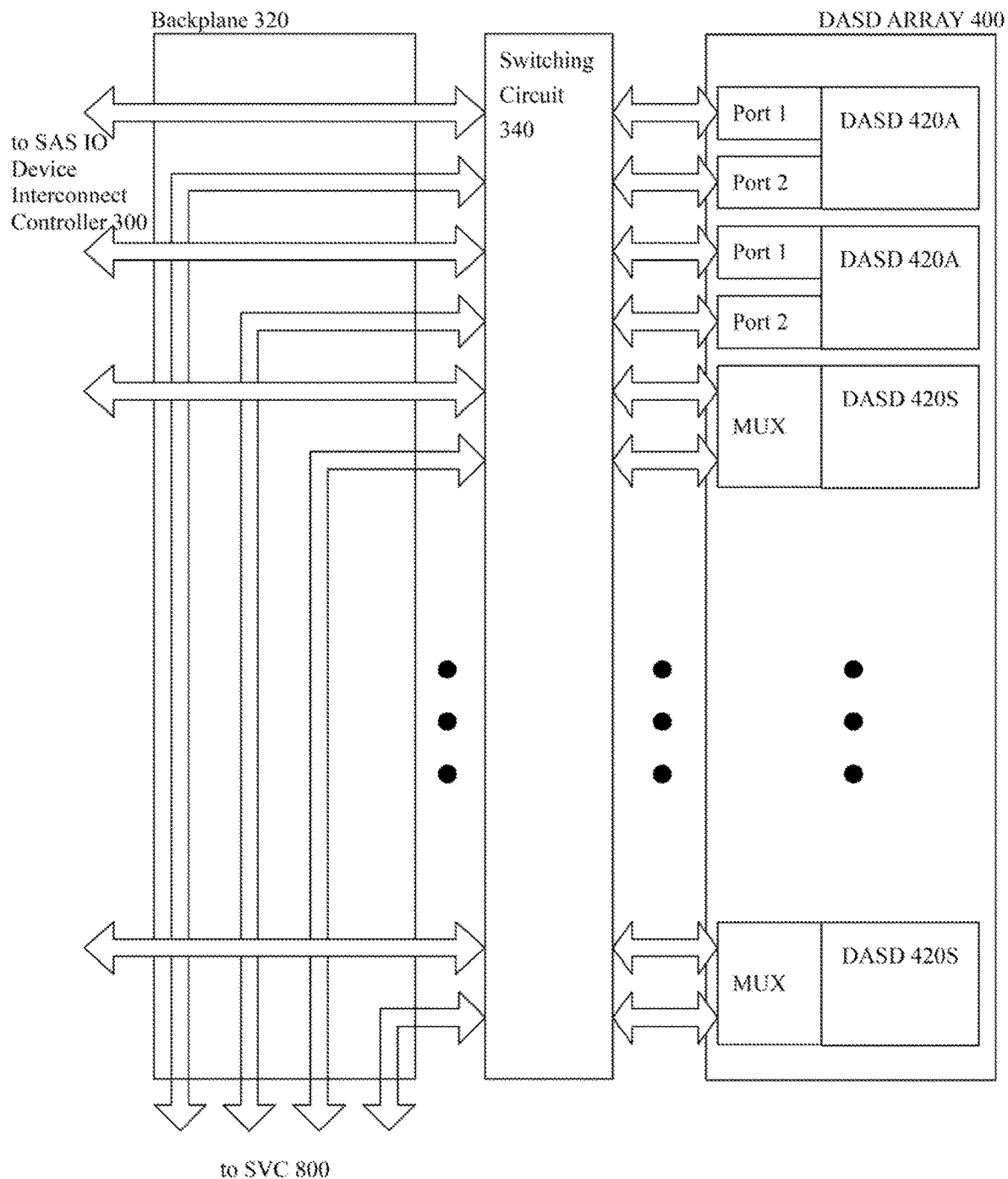
FIG. 8C is a block diagram illustrating in more detail the connecting arrangement between the backplane, the expanding circuit and other functional blocks in FIG. 2C.

FIG. 5C is a block diagram illustrating a third embodiment of the SAS Controller of FIG. 2C according to the present invention, in which the PCI-X to SAS controller 310 is connected to a backplane 320 and then to the expanding circuit 340 and finally, to the DASD array 400. FIG. 8C is a block diagram illustrating in more detail the connection between the backplane, the expanding circuit and other functional blocks in FIG. 2C and FIG. 5C. In this arrangement, the expanding circuit 340 is the same as that in the FIG. 5B; the backplane 320, however, provides a robust circuit board with electric wiring and connectors thereon so as to strengthen the connection between the SAS IO device interconnect controller 300 and the expanding circuit 340 and to facilitate attachment and detachment with respect to the SAS IO device interconnect controller 300.

Although the embodiments of the SAS Controller 300 disclosed in FIGS. 5A through 5C include two PCI-X to SAS controller 310, the SAS Controller 300 according to the present invention may also include one or more than two controller 310 in other embodiments thereof, depending on performance considerations, engineering considerations, and/or cost or market considerations. Those skilled in the art will know such adjustments and considerations can be easily accomplished without any difficulty.

FIGS. 7A through 7F show various block diagrams exemplifying the CPC according to the present invention and the connection thereof to other functional blocks of the SVC.

Figure 7A:
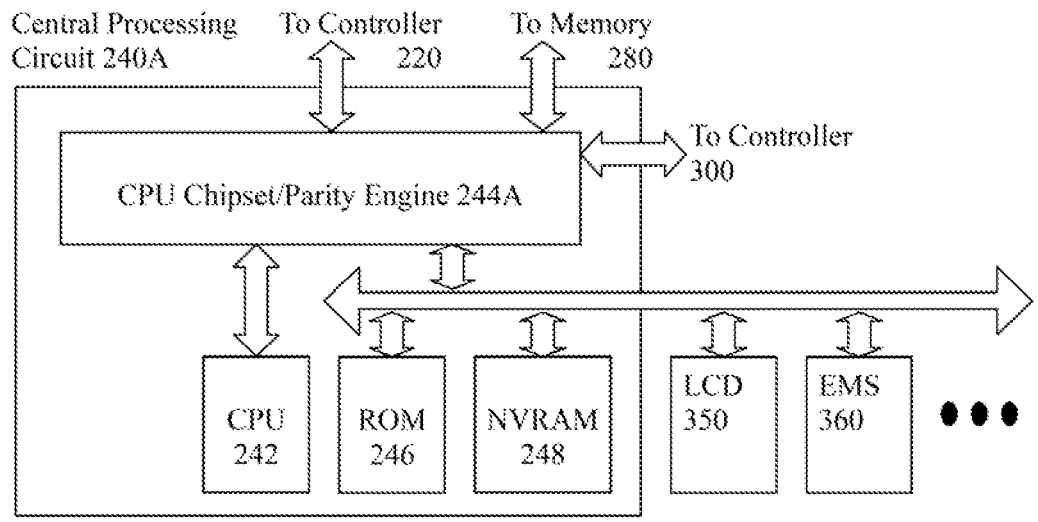
FIGS. 7A through 7F show various block diagrams exemplifying the CPC according to the present invention and the connection thereof to other functional blocks of the SVC.

In FIG. 7A, the first embodiment of the CPC block is shown as the CPC 240A, comprising the CPU chipset/parity engine 244A, the CPU 242, a ROM (Read Only Memory) 246, a NVRAM (Non-volatile RAM) 248, an LCD 350 and an enclosure management service circuitry EMS 360. The CPU can be, e.g., a Power PC. The ROM 246 can be a FLASH memory for storing BIOS and/or other programs. The NVRAM is provided for saving some information regarding the IO operation execution status of the disk which can be examined after an abnormal power shut-off occurs and meanwhile the IO operation execution does not complete. LCD module 350 shows the operation of the subsystem LCDs. EMS 360 can control the power of the DASA array and do some other management. The ROM 246, the NVRAM 248, the LCD 350 and the enclosure management service circuitry EMS 360 are connected to the CPU chipset/parity engine 244A through an X-bus. The CPU chipset/parity engine 244A has been explained earlier with FIG. 4.

Figure 7B:
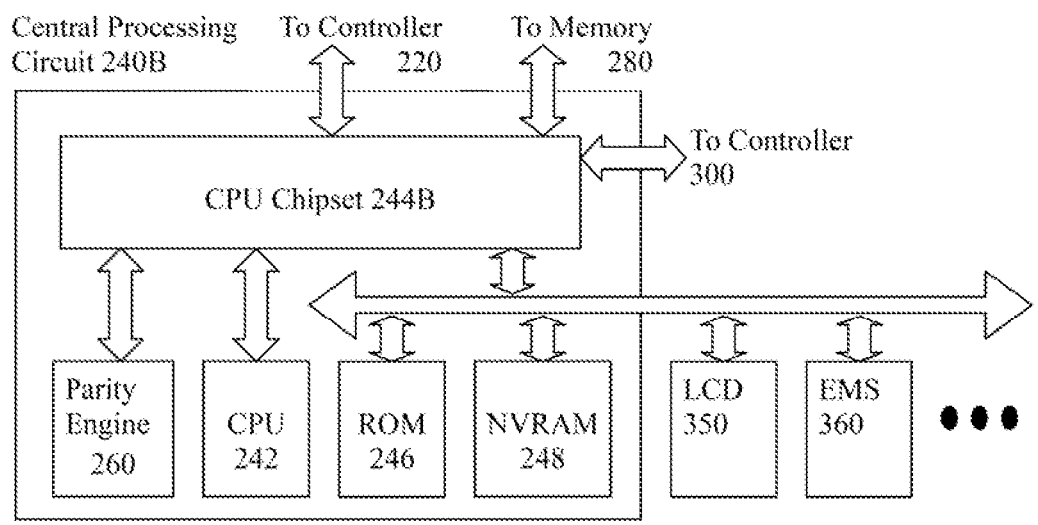

In FIG. 7B, the second embodiment of the CPC block is shown as the CPC 240B, comprising a CPU chipset 244B, the parity engine 260, the CPU 242, a ROM 246, a NVRAM 248, an LCD 350 and an enclosure management service circuitry EMS 360. The second embodiment CPC 240B is similar to CPC 240A, except that in CPC 240B, CPU chipset 244B and parity engine 260 are two separate chips.

Figure 7D:
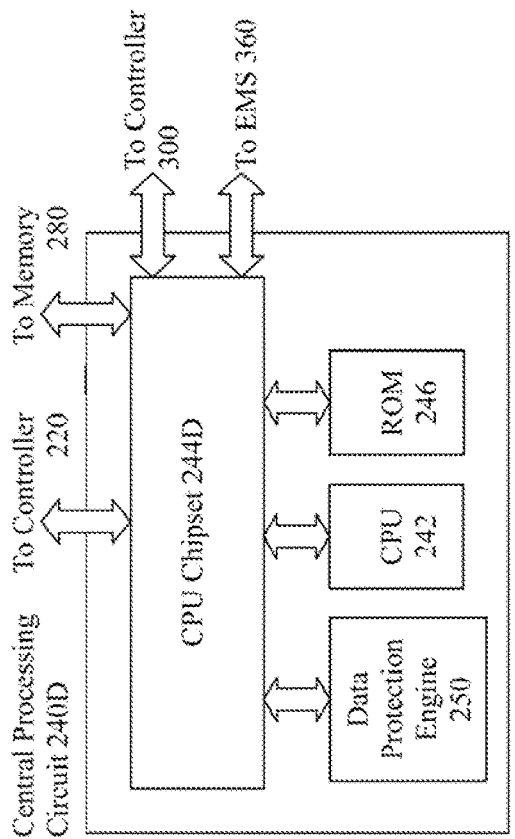
Figure 7F:
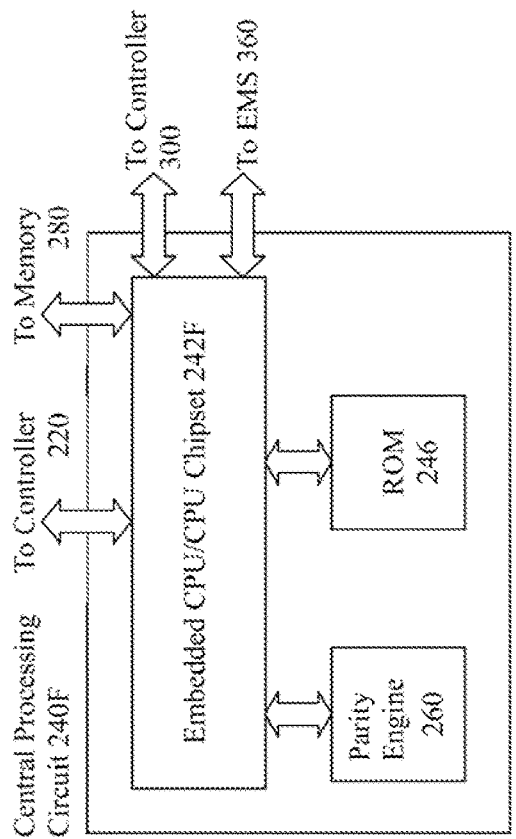
Figure 7C:
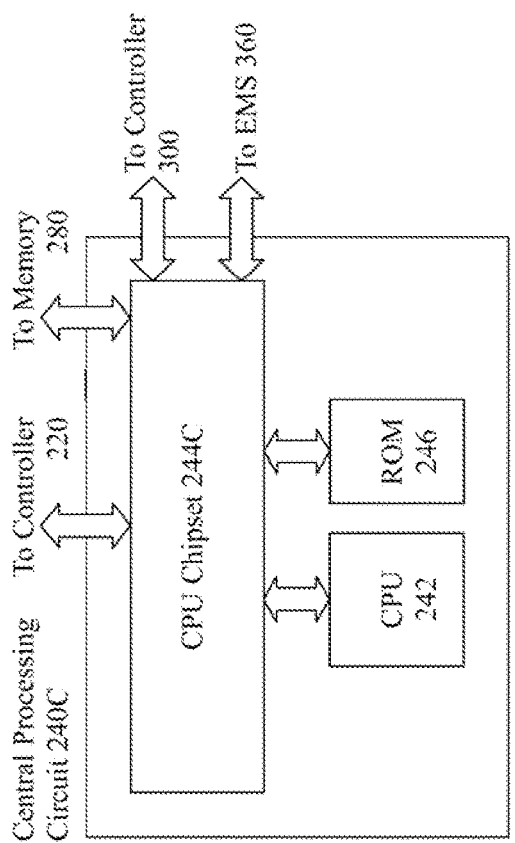

In FIG. 7C, the third embodiment of the CPC block is shown as the CPC 240C, mainly comprising the CPU chipset 244C, the CPU 242, and the ROM 246. The NVRAM 248 and LCD 350, though omitted in the FIG. 7C, each could be a part of the CPC 240C. In this embodiment, the parity engine is omitted. The CPC 240 can do without a parity engine if such functionality is not required by the SVC 200 or SVS 20. For example, for a JBOD emulator controller without parity function or subsystem X thereof, or, a RAID level 1 controller or subsystem thereof, no parity functionality is required, and thus parity functionality can be omitted. In another scenario, where the parity function is performed by the CPU which executes some parity function programs or codes rather than by a dedicated hardware like a parity engine, parity engine can be omitted. This could be a low performance but low cost solution for the parity functionality.

In FIG. 7D, the fourth embodiment of the CPC block is shown as the CPC 240, mainly comprising the CPU chipset 244D, A data protection engine 250, the CPU 242, and the ROM 246. The NVRAM 248 and LCD 350, though omitted in the FIG. 7D, each could be a part of the CPC 240D. Comparison with CPC 240C, CPC 240D further comprises a data protection engine 250, which can perform a data protection function more than and/or other than a parity function shown in FIG. 7B. For example, the data protection engine 250 may have an ECC (error correcting code) function.

Figure 7E:
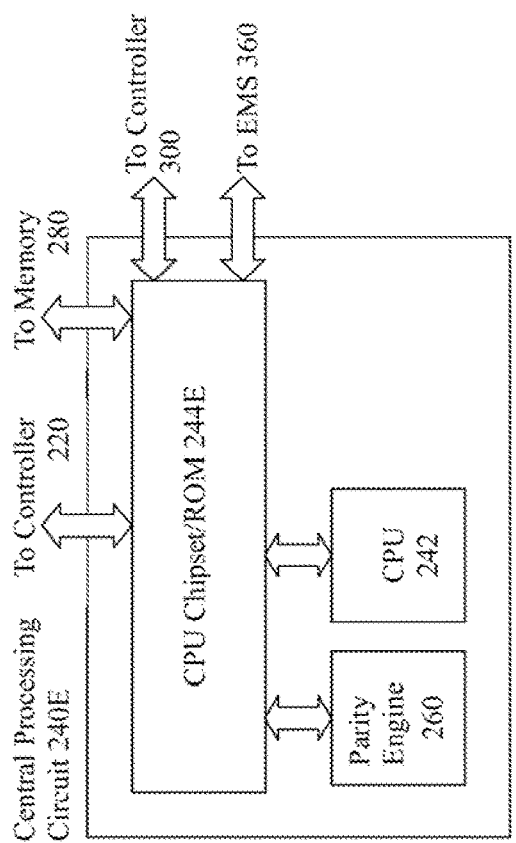

In FIG. 7E, the fifth embodiment of the CPC block is shown as the CPC 240E, mainly comprising the CPU chipset/ROM 244E, the parity engine 260, the CPU 242, and the ROM 246. The NVRAM 248 and LCD 350, though omitted in the FIG. 7E, each could be a part of the CPC 240E. Comparison with CPC 240C, CPC 240E further comprises the parity engine 260. The ROM is embedded made in the CPU chipset/ROM 244E chip. Or, the ROM is integrally provided in the CPU chipset/ROM 244E chip.

In FIG. 7F, the sixth embodiment of the CPC block is shown as the CPC 240F, mainly comprising the Embedded CPU/CPU chipset 242F, the parity engine 260, and the ROM 246. The NVRAM 248 and LCD 350, though omitted in the FIG. 7F, each could be a part of the CPC 240F. Comparison with CPC 240E, CPC 240F further comprises the parity engine 260 and the ROM 246 each separated from the Embedded CPU/CPU chipset 242F. The CPU is embedded made in the embedded CPU/CPU chipset 242F chip.

FIGS. 7A through 7F show only a few block diagrams exemplifying the CPC 240, other variations and/or modifications which can be easily made by those skilled in the art, should be considered as a portion of the present invention. For example, according to the trend of SOC (System On Chip), all the functional blocks in the CPC 240 can be formed integrally in one chip or embedded in a single die.

Further details of the operation flows and certain detail structure of the present invention are explained with FIG. 12 through FIG. 22 as follows.

Please refer to FIG. 12, which is another diagram of an embodiment of a SAS storage virtualizaiion computer system according to the present invention. The details of most of the hardware architecture thereof have been described earlier according to FIG. 1 through FIG. 11B.

Examples of the IO flow between the host entity 10 and the SVC 200 and the IO flow between the SVC 200 and the PSD array 400 according to the present invention will be introduced accordingly.

Figure 13:
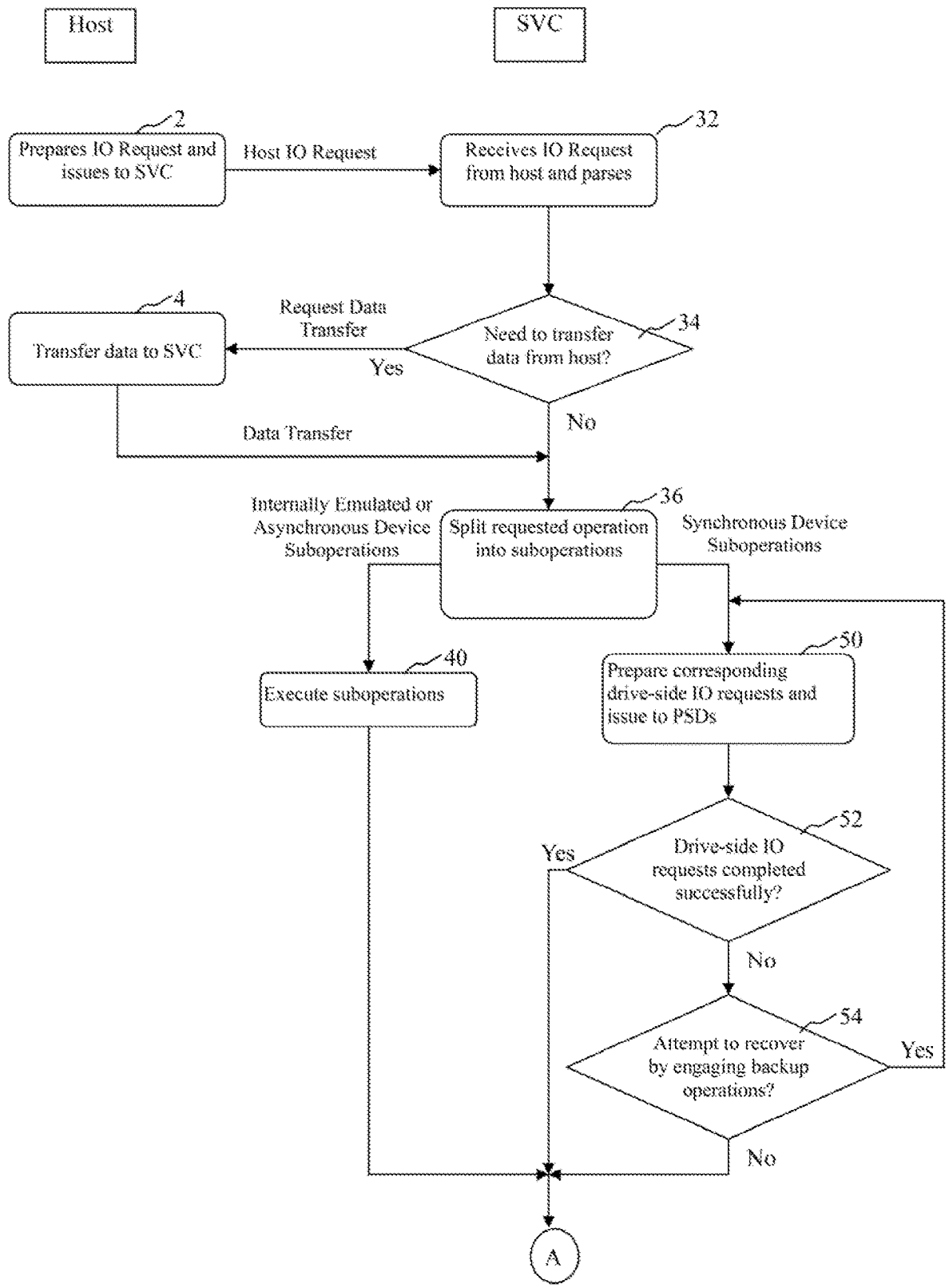
FIG. 13 and FIG. 14 are examples of the IO flow between the host entity and the SVC of FIG. 12.
Figure 14:
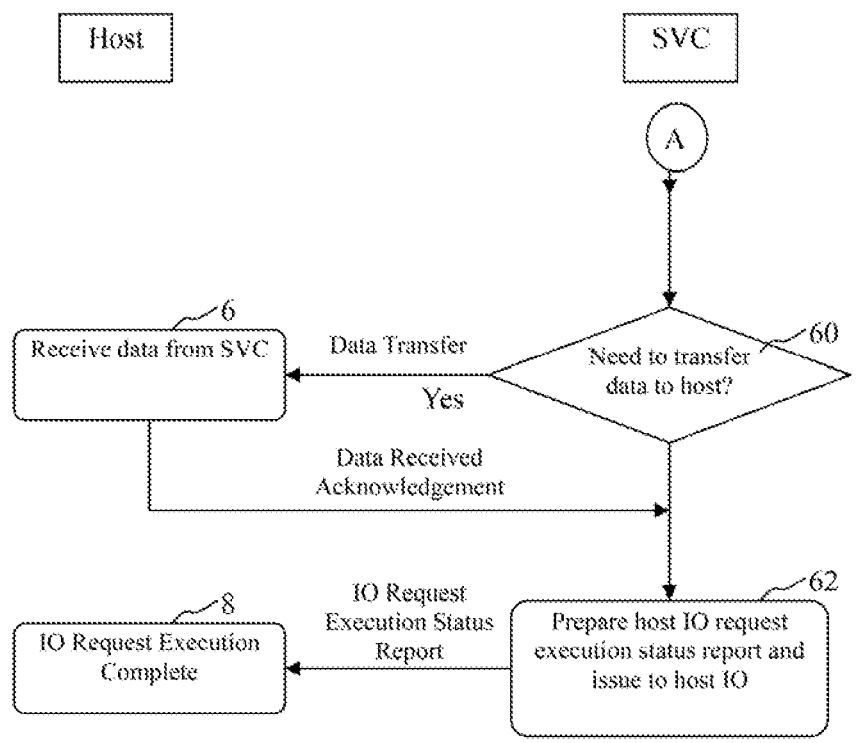

Please refer to FIG. 13 and FIG. 14 where an example of the IO flow between the host entity 10 and the SVC 200 is illustrated. IO requests are received from the host entity 10 over one of the host-side IO device interconnects. The IO requests are parsed to determine what operation is to be performed and, for asynchronous device and synchronous device operations, on which section of the logical media unit the operation is to be performed. If the operation consists only of internally-emulated and asynchronous device sub-operations, then the SVC 200 executes the associated sub-operations including transferring any associated data to/from the host entity 10 and then responding to the host entity 10 with a status report that indicates whether the operation succeeded or failed and for what reason(s). If the operation includes synchronous device operations, then appropriate device-side IO requests are generated and issued to the appropriate PSDs 420 in response. The contents of each individual IO request and the distribution of the IO requests to different PSDs 420 is determined by the nature of the particular mapping that is associated with the particular LMU. Prior to or concurrently with the execution of device-side IO requests, any "pay load" data that is to be obtained from the host entity 10 as part of the host-side IO request execution and then transferred to the PSD 420 is transferred from the host entity 10 to the SVC 200.

On successful completion of the device-side IO requests, data read in response to the device-side IO request is delivered to the entity requesting it, which, in a caching implementation, may be the cache and any data requested by the host is delivered to the host entity 10. A status report is then generated and transmitted to the host entity 10 indicating the success of the operation. If there were device-side IO requests that did not complete successfully, the SVC 200 may engage backup operations that allow successful completion of the sub-operation even in the face of individual device-side IO request failures. Such operations will typically include generating other device-side IO requests to different media sections to recover the data in the case of reads or to write backup data in the case of writes. RAID 5 is an example of where data on other PSDs 420 can be used to regenerate data that could not be read off from a particular PSD 420. Alternately, the SVC 200 could elect to fail the sub-operation aborting the delivery of data to the host entity 10 and returning a corresponding status report to the host entity 10.

Figure 15:
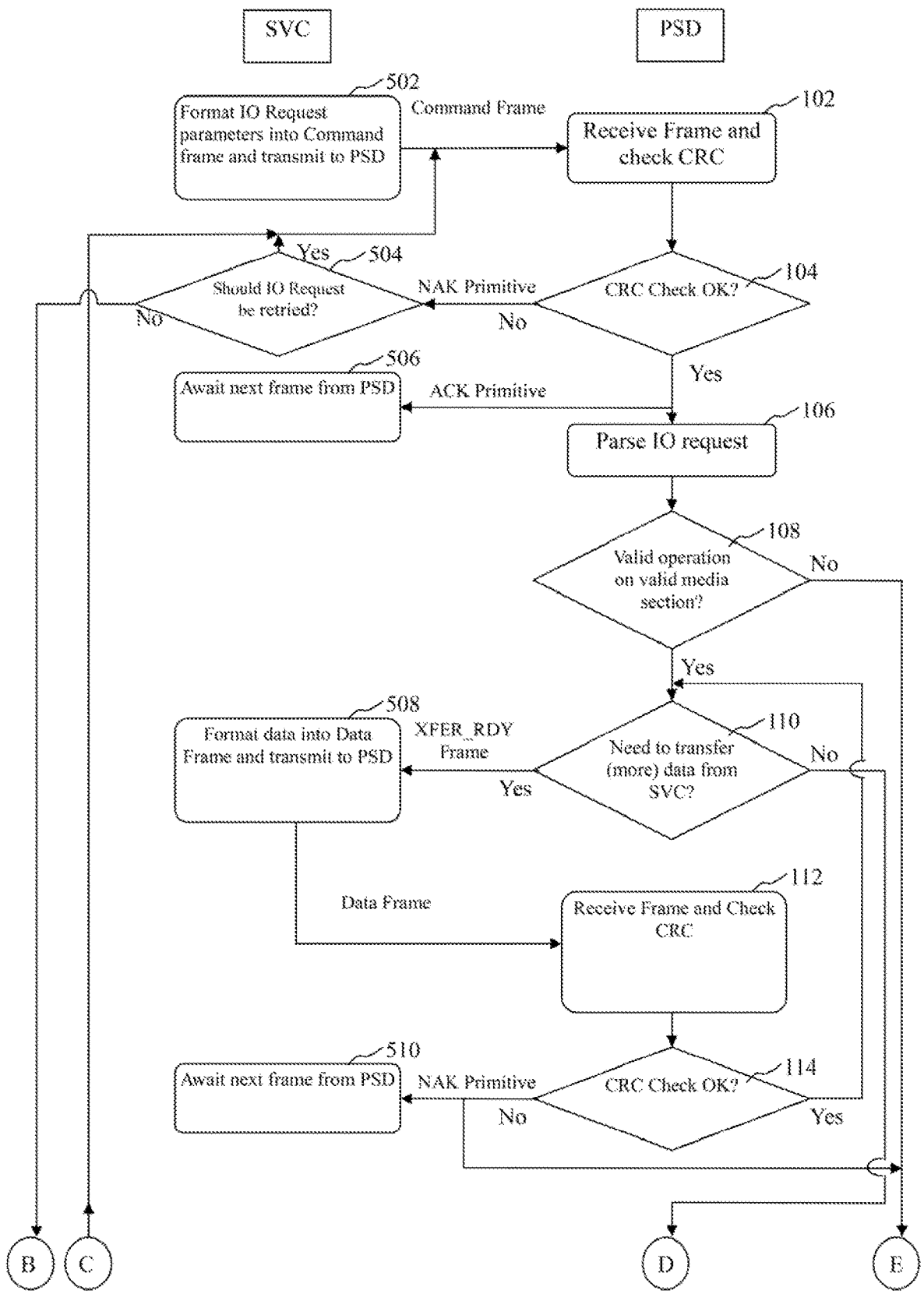
FIG. 15 and FIG. 16 are examples of the IO flow between the SVC and a PSD of FIG. 12.
Figure 16:
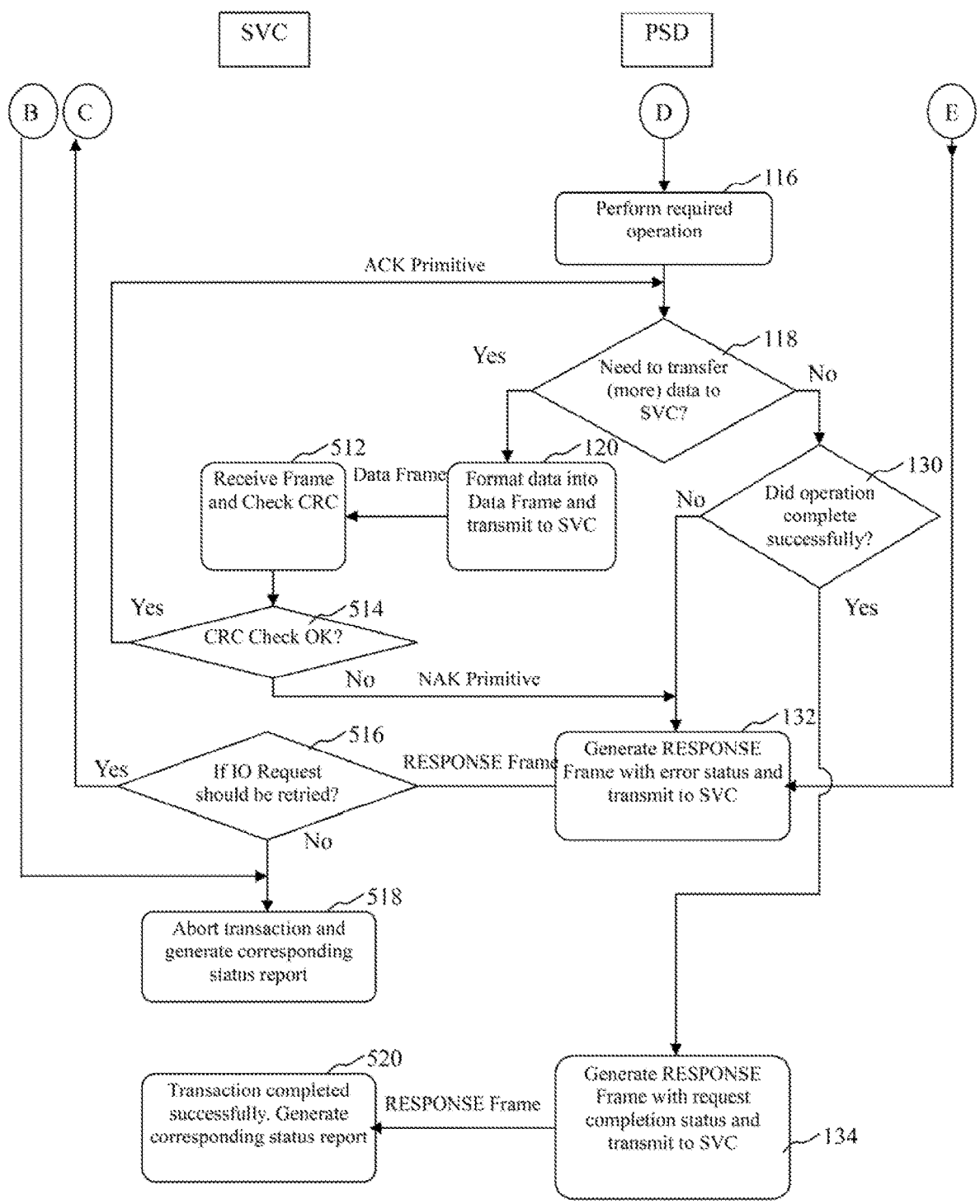

An example of the IO flow between the SVC 200 and a SAS PSD 420 is shown in FIG. 15 and FIG. 16. For each device-side IO request generated as part of a synchronous device sub-operation, a connection will be established first with SSP protocol for SAS drives and the IO request information defining the parameters of the particular IO operation (e.g., destination media section base address, media section length, command indicating operation to be performed, etc.) is packaged into a SSP frame and then transmitted to the associated PSD 420 over the SAS interconnect to which the specified PSD 420 is connected. Each frame comprises a Cyclic-Redundancy Check (CRC) value that is computed from the data in the frame so that if the data in the frame gets modified in any way en-route to the destination PSD 420, a consistency check of the data performed by the PSD 420 on receipt of the frame against the CRC of the frame will fail and the PSD 420 will respond with an NAK primitive sent to the SVC 200 following the receipt of the frame indicating that the frame was not received intact. The SVC 200 may then, at its option, re-send the frame or if may abort the transaction and return a corresponding status report to the requesting entity.

If the frame is received intact, the PSD 420 responds with an ACK primitive sent to the SVC 200 following the receipt of the frame informing the SVC 200 that the frame was received intact. The PSD 420 parses the request contained in the frame to determine the nature of the operation to be performed and the section of media on which it is to be performed. If the operation is not a valid operation on the specified section of media or the section of media is not a valid one, the PSD 420 responds to the SVC 200 with a corresponding status report, which is done by generating an RESPONSE command containing the status information, packaging it into a SSP frame and transmitting it back to the SVC 200. Otherwise, the requested operation is performed.

Prior to or during execution of the requested operation, if the transfer of payload data from the SVC 200 to the PSD 420 is required, the PSD 420 will generate and issue an SSP XFER_RDY frame requesting the first set of data be sent. The SVC 200 will then split the data into sections whose lengths do not exceed the maximum length that is allowed to be transmitted in a single frame by the SAS protocol. Each section is packaged into a DATA frame and then shipped to the PSD 420 one at a time. Following the transmission of each frame, the SVC 200 waits for receipt of a XFER_RDY frame from the PSD 420 indicating that the PSD 420 is ready to receive more data prior to transmitting the next frame of data. Each frame of data contains a CRC value generated from the data, which is checked by the PSD 420 for consistency with the data on receipt of each frame. If an inconsistency is discovered between the data in the frame and the CRC of the frame, the IO operation is aborted and the PSD 420 generates a corresponding status report, which is done by generating a SSP RESPONSE frame with the status information and transmitting it back to the SVC 200. On receipt of this status, the SVC 200, may, at its option, re-issue the initial IO request to retry the operation or it may abort the transaction and return a corresponding status report to the requesting entity.

During execution of the requested operation and/or after operation is complete, if the transfer of payload data from the PSD 420 to the SVC 200 is required, the PSD 420 prepares the data (which may require reading the data from the storage medium) and splits it into sections whose lengths do not exceed the maximum length that is allowed to be transmitted in a single frame by the SAS protocol. Each section is packaged into a DATA frame and then transmitted to the SVC 200 one frame at a time. Once again, a CRC value is generated from the data in the frame and sent to the SVC 200 in the frame and is checked by the SVC 200 for consistency with the data on receipt of each frame. If an inconsistency is discovered between the data in the frame and the CRC of the frame, the SVC 200 will respond with an NAK primitive sent to the PSD 420 following the receipt of the frame indicating that the frame was not received intact. The PSD 420 will typically then abort the IO operation immediately generating a corresponding status report by generating a SSP RESPONSE frame containing the status information and transmitting it back to the SVC 200. On receipt of this status, the SVC 200, may, at its option, re-issue the initial IO request to retry the operation or it may abort the transaction and return a corresponding status report to the requesting entity.

If all data is received intact by the SVC 200, it will respond with ACK primitive to each of DATA frames. When ail data that needs to be delivered to the SVC 200 as part of the IO request execution is transferred to the SVC 200, the PSD 420 will generate a status report indicating whether the operation completed successfully and, if not, for what reason. This status report is formatted into a SSP RESPONSE frame and shipped off back to the SVC 200. The SVC 200 then parses this status report to determine the success or failure of the request. If request failure was reported, the SVC 200, may, at its option, re-issue the initial IO request to retry the operation or it may abort the transaction and return a corresponding status report to the requesting entity.

For the IO flow between the SVC 200 and a SAT A PSD, it is similar to that between the SVC 200 and a SAS PSD, except for the following main differences. First, the connection will be established with STP protocol for SATA drives rather than SSP protocol. Second, after the connection is established, data transmission follows SATA protocol. Third, when a SATA drive is connected to a SAS controller 310 of the SAS device side IO device interconnect controller 300 without passing through an expanding circuit 340, there is no need to establish a connection before data transfer.

In a legacy Parallel SCSI (P-SCSI) SVC, the overall flow is similar to the above, however, the initial device-side IO request information that defines the parameters of the IO operation (e.g., destination media section base address, media section length, etc.) is not packaged into a frame that is checked for validity of the data conveyed as it is in SAS with the frame CRC. Therefore, such data could be inadvertently corrupted (e.g. due to noise) during the transfer from SVC to PSD may go undetected, potentially leading to a catastrophic data corruption situation in which data gets written to the wrong section of media possibly due to corruption of the destination media section base address and/or media section length that are contained in the initial IO request data. In the SAS implementation, such a corruption will be detected because the frame CRC will be inconsistent with the data and the PSD will then abort the command rather than writing the data to or reading the data from the wrong section of the media. This is one of the primary benefits of a SAS implementation of an SVC over a P-SCSI.

In actual operation, the SVC 200 will typically concurrently process and execute multiple operations in response to multiple queued host-side IO requests. These requests may be from a single host or multiple hosts. These operations may consist of synchronous device sub-operations that execute concurrently. Each such sub-operation may generate multiple device-side IO device requests addressing different PSDs 420. Each such IO device request may involve transferring significant amounts of data between the SVC 200 and the addressed PSD 420 over the device-side IO device interconnect that connects the two. Typically, the SVC 200 will be configured such that IO device requests get distributed among the different PSDs 420 and the different device-side IO device interconnects so as to maximize the collective bandwidth of all the PSDs 420 and IO device interconnects. An example of configurationally improving collective bandwidth is combining PSDs 420 into logical media units using a RAID 5 approach rather than RAID 4 combination. In RAID 4, a dedicated parity drive is assigned to which all parity updates are directed. For writes, in which every write requires a parity update, the parity drive may end up being far busier than data drives. For reads, the parity drive is not accessed, meaning that there is one drive that is not contributing to the task of delivering data. RAID 5 distributes the parity equally between all drives so that, assuming IO requests address physical media in an evenly distributed way, no one drive is busier than any other on writes and all drives contribute to the task of delivering data on reads.

In addition, the SVC 200 may be equipped with the means and intelligence to dynamically adjust the distribution of IO device requests among the various PSDs 420 and/or IO device interconnects to further optimize collective PSD/Interconnect bandwidth. An example of this is load-balancing between IO interconnects that connect to the same set of PSDs 420. The SVC 200 may intelligently keep track of the IO device requests that were delivered over each interconnect and from this information determine over which interconnect the next IO device request should be sent in order to maximize the collective bandwidth of the interconnect. Another example is load-balancing data read IO requests between a mirrored set of PSDs 420. Once again, the SVC 200 may intelligently keep track of the IO device requests that were addressed to each PSD 420 to determine to which the next IO device request should be sent in order to maximize the collective bandwidth of the mirrored set of PSDs 420.

With the ability to maximize collective bandwidth of device-side IO device interconnects, overall performance of a storage virtualization subsystem of which the SVC plays a key role may, under certain types of host IO request loads, be limited by this collective bandwidth. Under such conditions, increasing the collective bandwidth may result in significantly better performance. Overall device-side IO device interconnect performance is determined by two factors: the IO-request-execution/data-transfer rate of the interconnect and the number of interconnects over which IO-requests/data-transfers are distributed. The higher the IO-request-execution/data-transfer rate of the interconnect, the greater the overall performance. Similarly, the more interconnects there are over which device-side IO requests and data transfers can be distributed, the greater the overall performance of the device-side IO interconnect subsystem.

As mentioned before, Parallel SCSI interconnects do not scale well beyond a certain point because of the number of dedicated signal lines (68) that must be used to form each distinct interconnect. In addition, it is also significantly more expensive and occupies a significantly larger footprint on a printed circuit board (PCS) per interconnect than either P-ATA or S-ATA. A typical SVC might implement 4 to 8 distinct device-side Parallel SCSI IO device interconnects, each interconnect costing several times that of a P-ATA/S-ATA interconnect. Fibre interconnects do not scale well because of the size of the footprint on the PCB and cost per interconnect, typically being an order of magnitude greater than P-ATA/S-ATA.

SAS IO device interconnects scale well because each interconnect only consists of 4 signal lines and they allow for a high level of integration such that a single SAS controller SC may support 8 interconnects versus 2 for the standard Parallel SCSI and Fibre of equivalent pin count and size. Further, SAS per-interconnect cost is low enough to permit large numbers of device-side SAS IO device interconnects to be included on a single cost-effective SVC.

In order to increase the number of PSDs that can be connected to the SVC, the present invention optionally includes one or more expansion device-side multiple-device IO device interconnects, herein referred to as device-side expansion ports, such as Parallel SCSI or Fibre FC-AL on the SVC. These interconnects will typically be wired in such away as to allow external connection of external expansion chassis. These chassis could be simple "native" just a bunch of drives (JBODs) of PSDs directly connected to the interconnect without any intervening conversion circuitry or could be intelligent JBOD emulation subsystems that emulate "native" JBODs using a combination of SAS or SATA PSDs and a single or redundant set of SVCs that provide the conversion from the multiple-device IO device interconnect protocol that provides the connection of the JBOD subsystem to the primary storage virtualization subsystem to the device-side IO device interconnect (SAS or SATA) protocol that provides the connection between the JBOD SVC(s) and the PSDs that they manage.

Although in FIG. 12, only one SAS interconnect 201 is connected to each DASD 420; however, alternatively, when SAS DASDs such as SAS hard disk drives having two ports provided thereon, each SAS HDD may have two interconnects connected to the SVC 200 with each interconnect through one port thereof so as to be configured into a redundant port/interconnect pair between each SAS HDD and SVC 200.

Figure 17:
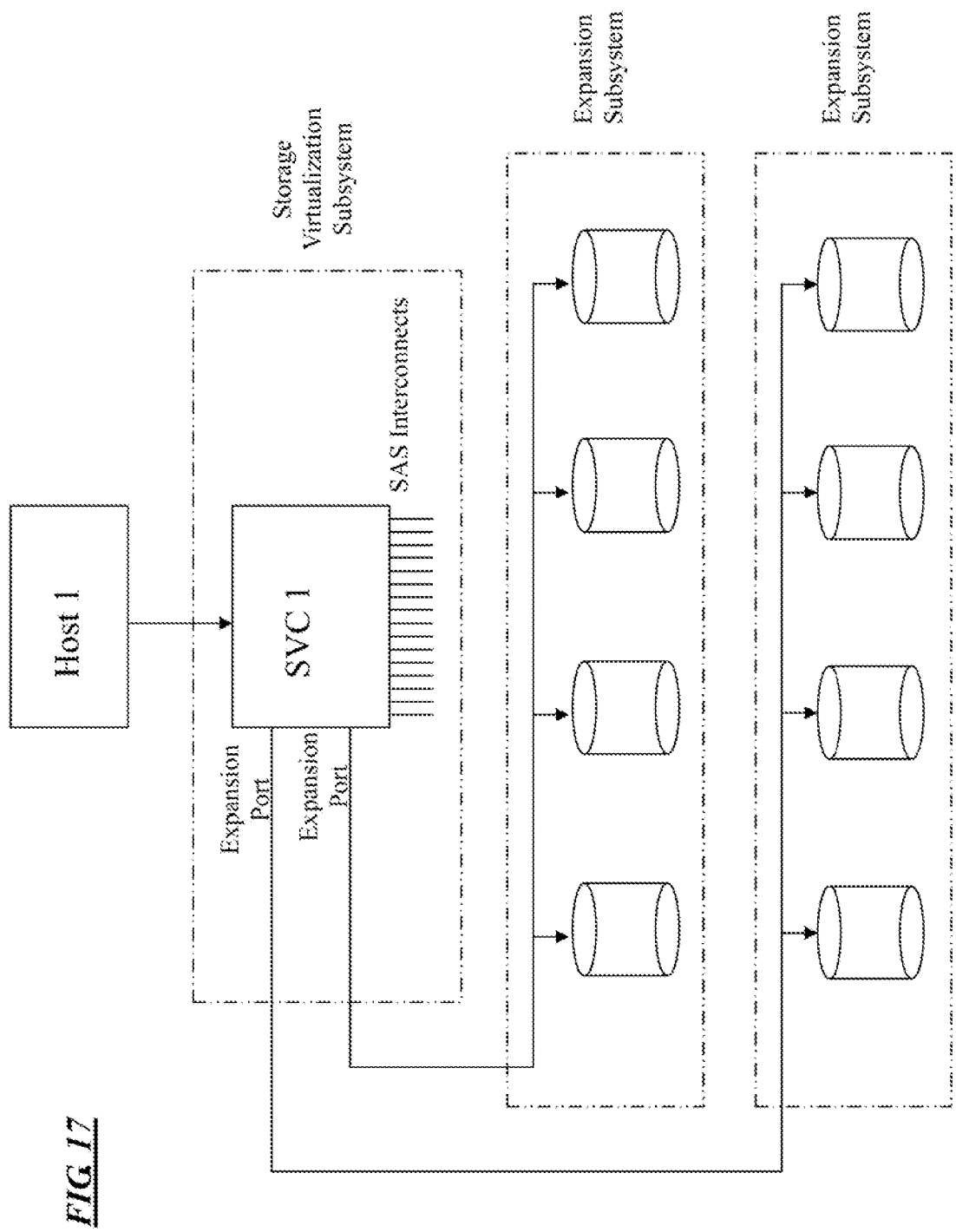
FIG. 17 is a block diagram of a first embodiment of the storage virtualization subsystem supporting device-side expansion ports.
Figure 18:
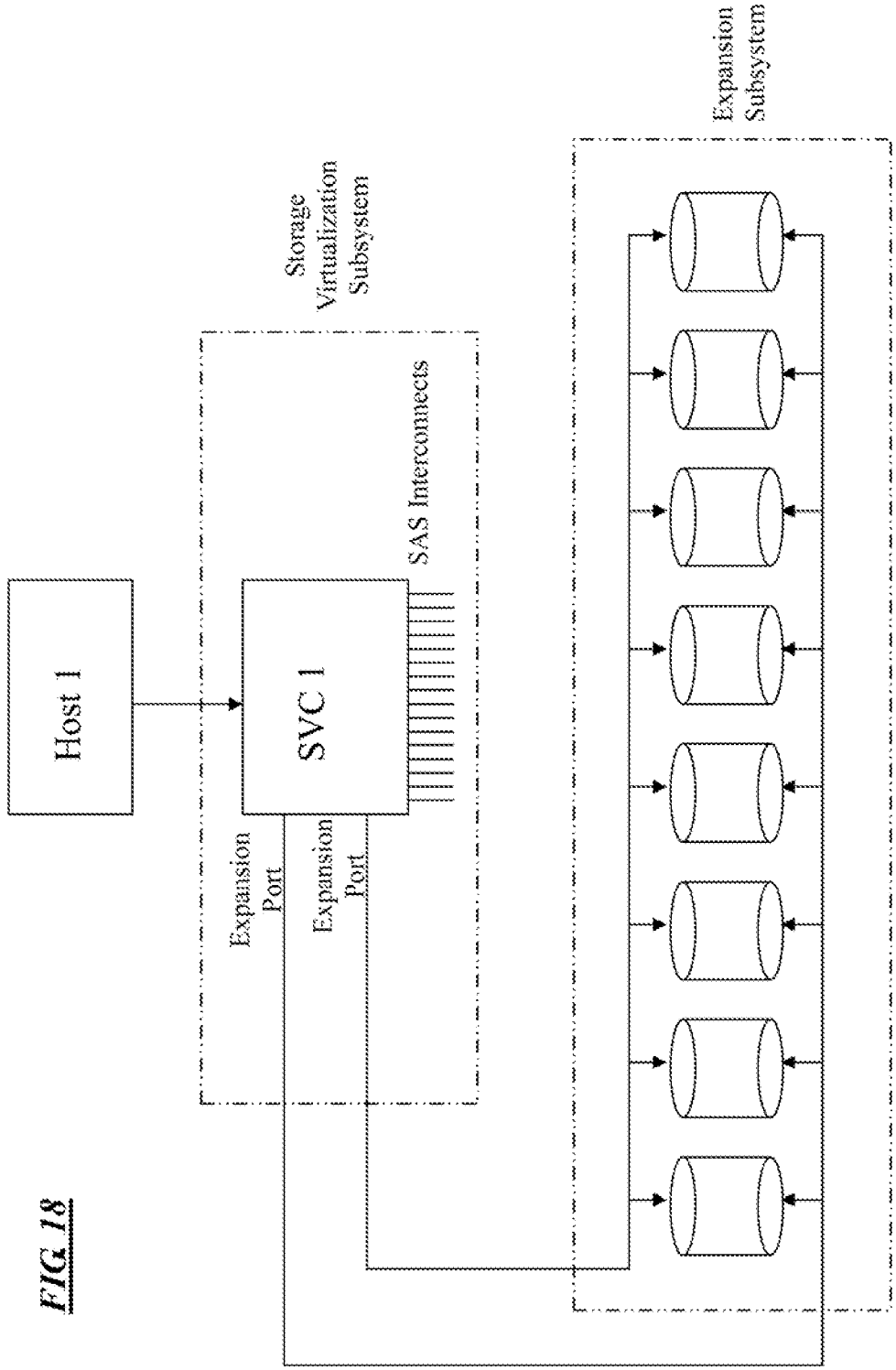
FIG. 18 is a block diagram of a second embodiment of the storage virtualization subsystem supporting device-side expansion ports.

Please refer to FIG. 17, which is an embodiment diagram of a storage virtualization subsystem supporting device-side expansion ports. In FIG. 17, each storage unit to which the expansion ports are connected is single-ported. However, if the storage units to which the expansion ports are connected are dual-ported, then a SVC equipped with one or more pairs of redundantly-configured expansion ports could have one of the ports in a redundant pair connected to one of the ports in the dual-ported pair in a storage unit and the other port in the redundant pair connected to the other port in the storage unit's dual-ported pair. FIG. 18 depicts such a configuration. In this case, if one of the SVC ports in the redundant pair malfunctions, or one of the storage unit ports in the dual-ported pair malfunctions, or one of the IO device interconnects connecting one of the SVC ports in the redundant pair to one of the storage unit ports in the dual-ported pair breaks or becomes blocked, access to the storage unit by the SVC can still be accomplished via the alternate path consisting of the interconnect connecting the alternate SVC port to the alternate storage unit port.

Figure 19:
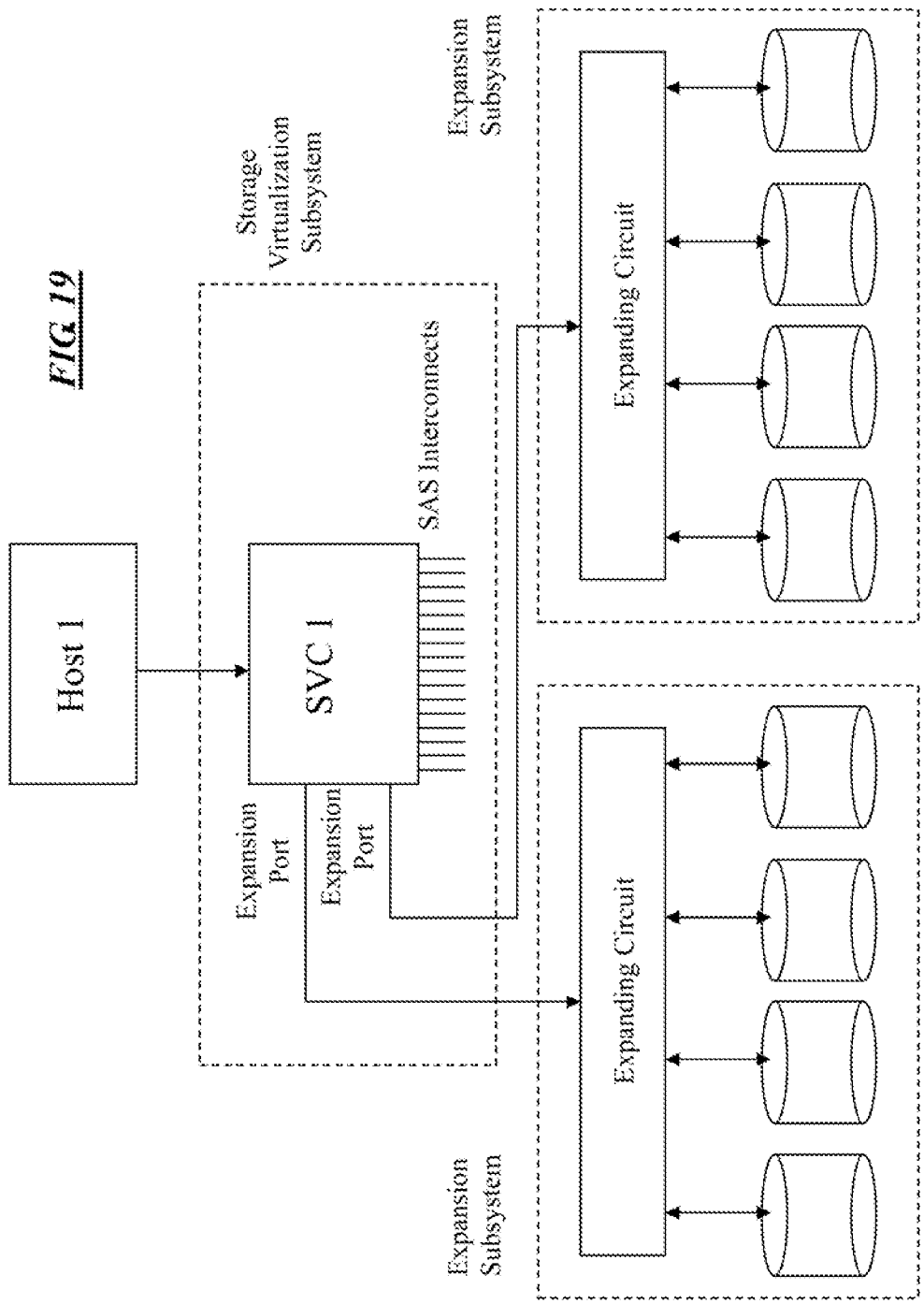
FIG. 19 and FIG. 20 show block diagrams of embodiments of the storage virtualization subsystem supporting device-side expansion ports connecting to DASDs through an expanding circuit external.
Figure 20:
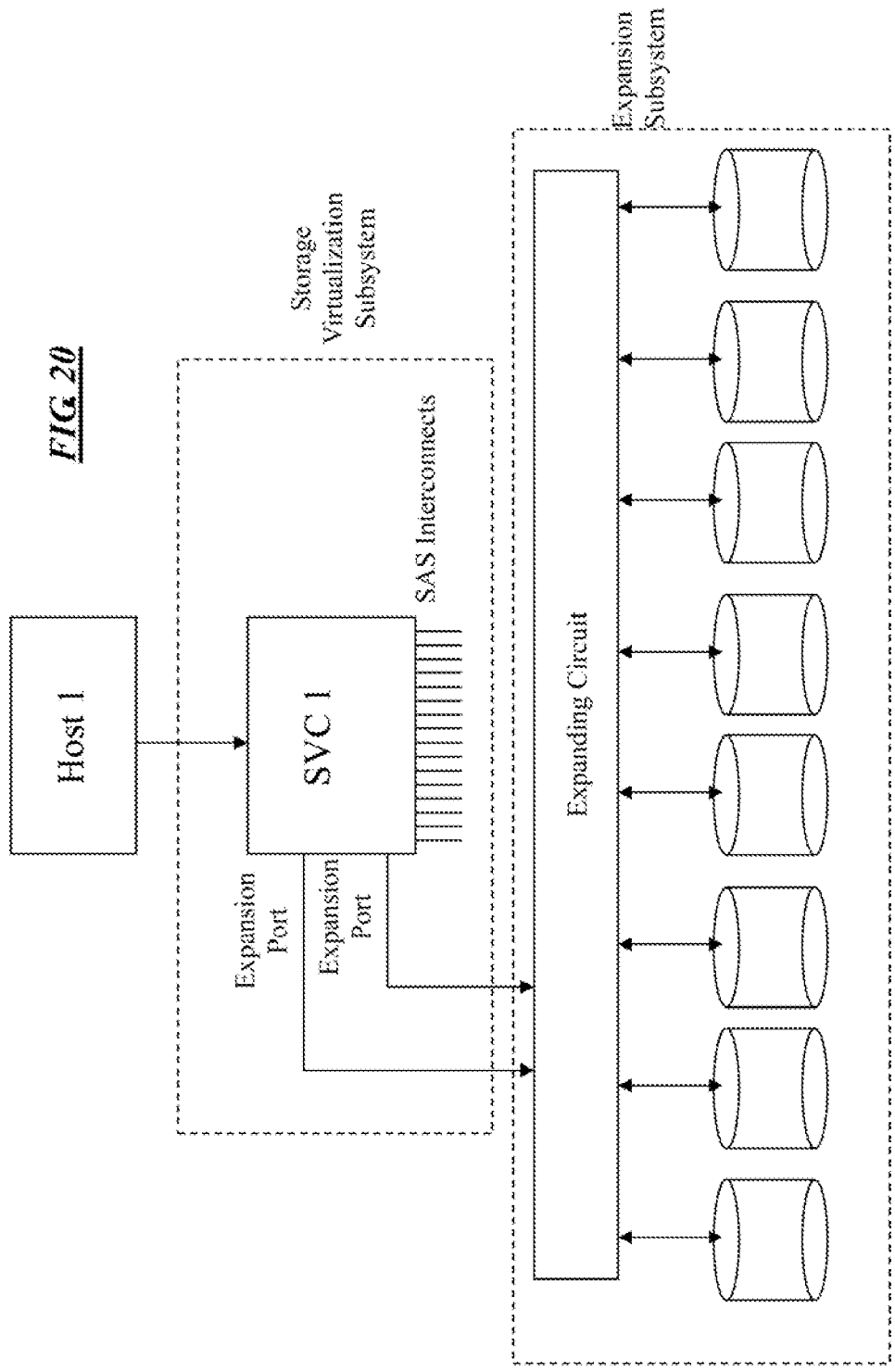

Please refer to FIG. 19, which is another embodiment diagram of a storage virtualization subsystem supporting device-side expansion ports. The SVC 200 may have one or more device-side expansion ports provided therein each connecting to an expanding circuit external to SVC 200. Since an external expanding circuit may connect to a lot of DASDs and therefore increase the number of DASDs that can be added to the storage subsystem. Please refer to FIG. 20, which is still another embodiment diagram of a storage virtualization subsystem supporting device-side expansion ports. The SVC 200 may have one or more device-side expansion ports provided therein all connecting to an expanding circuit external to SVC 200.

Figure 21:
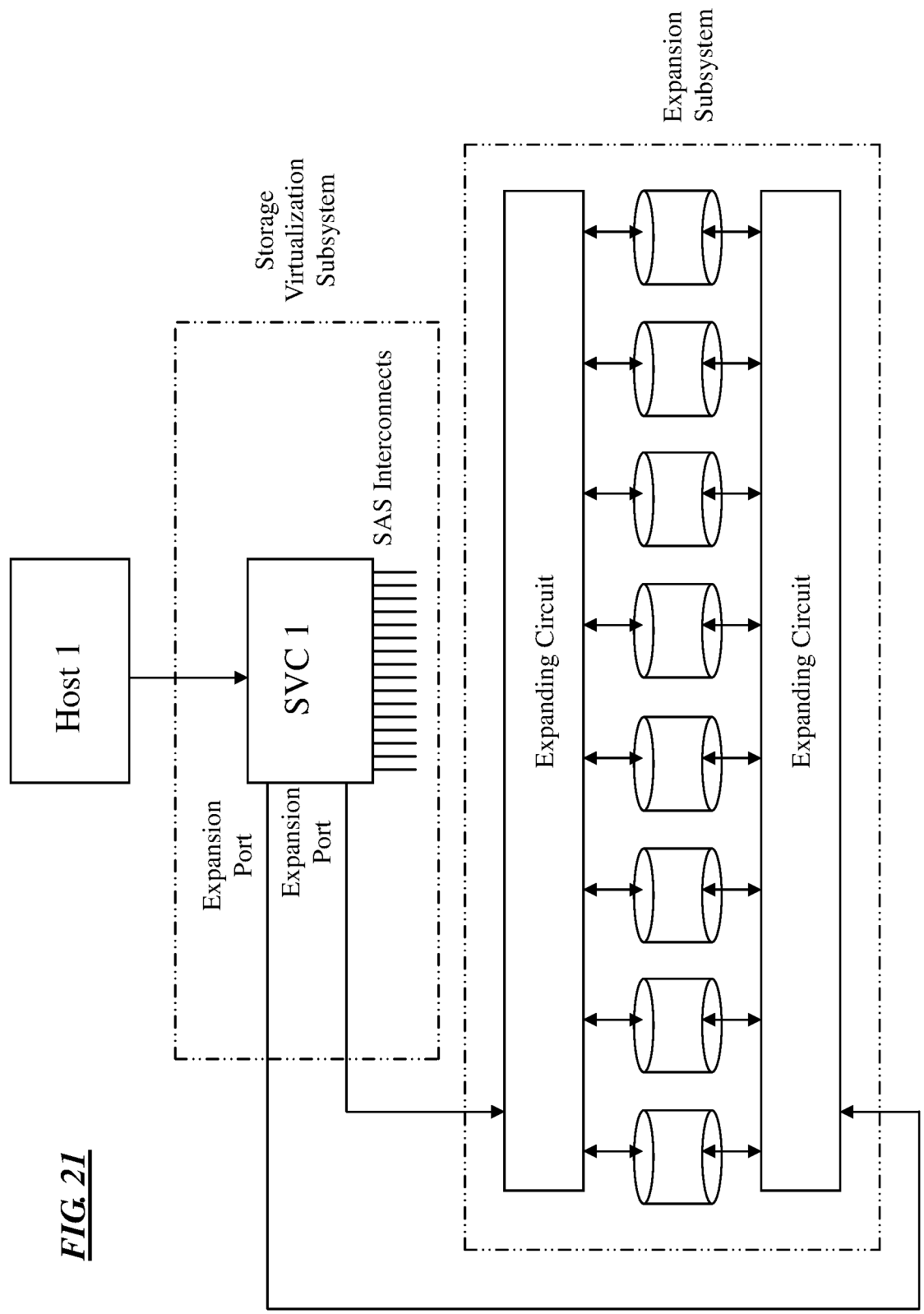
FIG. 21 and FIG. 22 show block diagrams of embodiments of the storage virtualization subsystem supporting device-side expansion ports connecting to dual-ported DASDs through an expanding circuit external.
Figure 22:
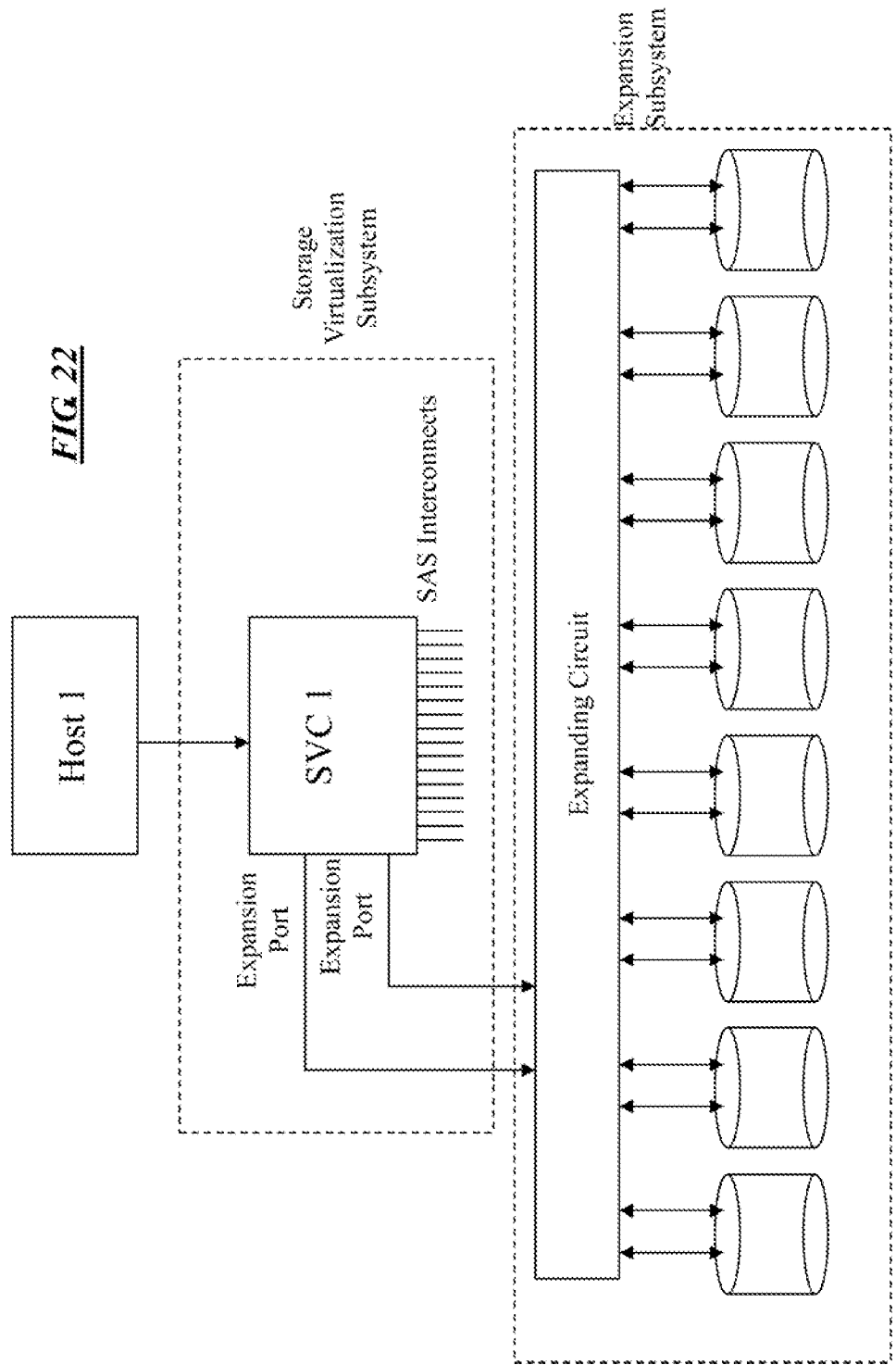
Figure 23:
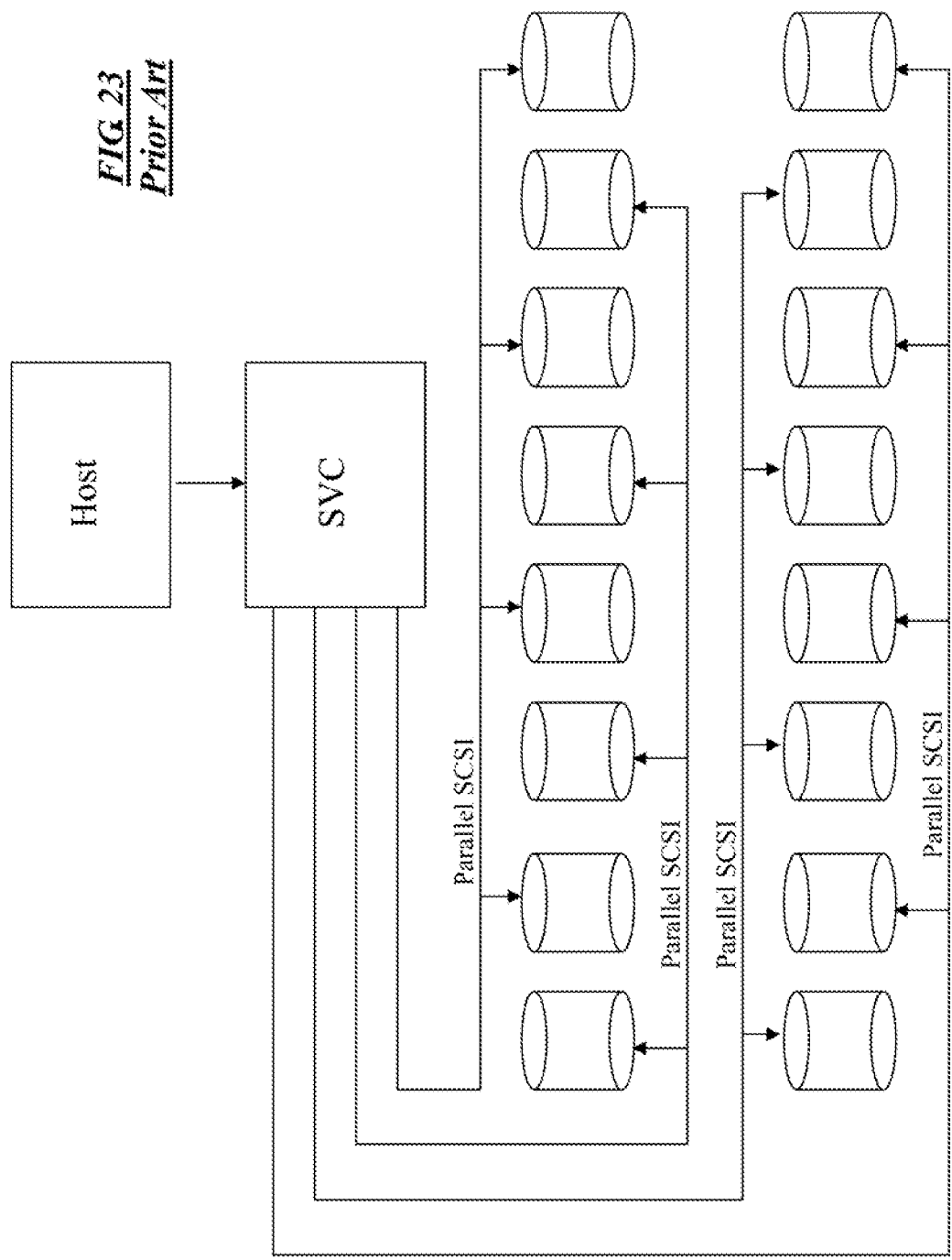
FIG. 23 is a block diagram of a conventional storage virtualization computer system using Parallel SCSI as the primary device-side IO device interconnect.
Figure 24:
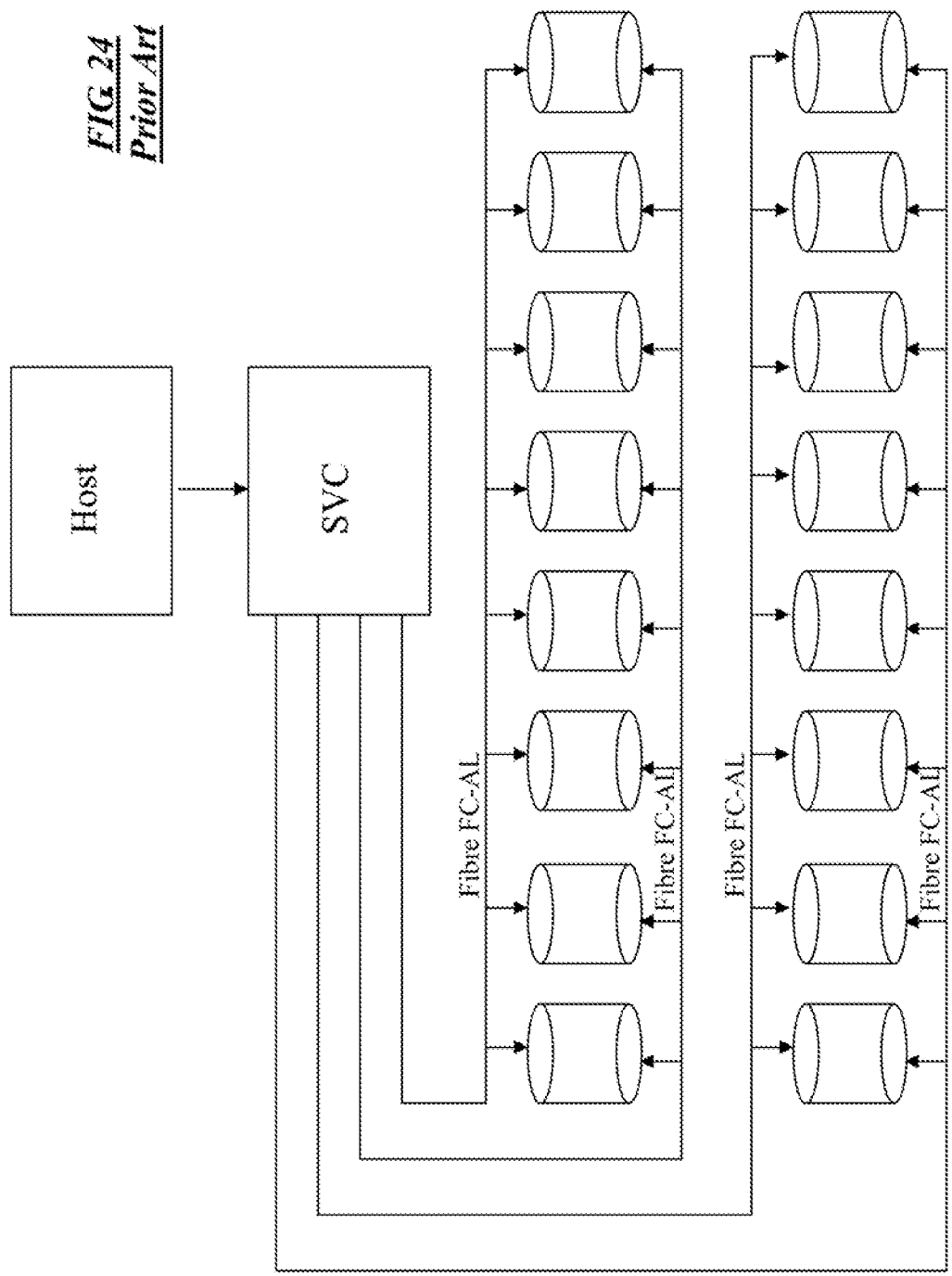
FIG. 24 is a block diagram of a conventional storage virtualization computer system using Fibre FC-AL as the primary device-side IO device interconnect.

Please refer to FIG. 21, which is another embodiment diagram of a storage virtualization subsystem supporting device-side expansion ports connecting to DASDs of dual ports. The SVC 200 may have one or more device-side expansion ports provided therein each connecting to an expanding circuit external to SVC 200. Please refer to FIG. 22, which is still another embodiment diagram of a storage virtualization subsystem supporting device-side expansion ports connecting to DASDs of dual ports. The SVC 200 may have one or more device-side expansion ports provided therein all connecting to an expanding circuit external to SVC 200.

Another feature that an SVC might typically implement is redundancy in the host-side interconnects in which multiple host-side interconnect ports are included on the SVC and LMUs are presented to the host identically over two or more of these interconnects. This feature is designed to allow the host the ability to maintain access to the LMU even if one of the interconnects and/or ports on the interconnect should break, become blocked or otherwise malfunction.

In this implementation, the two separate SVC host-side ports connect to two entirely separate host-side IO device interconnects and host ports (not shown). In an implementation supporting redundancy in the host-side interconnects, the SVC would present the same set of logical media units in an identical fashion on both host ports.

Storage virtualization subsystems typically also include functionality that allows devices in the subsystems, such as power supplies, fans, temperature monitors, etc, to be managed and monitored by the SVC(s). As mentioned before, this functionality is commonly referred to as enclosure management services (EMS). Often times, EMS is implemented using intelligent circuitry, that is circuitry that includes a CPU and runs a software program to achieve the desired functionality. Traditional Parallel SCSI and Fibre SV subsystems have typically relied on the standard SCSI protocols SAF-TE and SES, respectively, as the primary communication mechanism that the SVC uses to communicate with the SVS's EMS. These protocols, in turn, rely on a connection between the SVC(s) and the SVS consisting of an IO device interconnect that provides transport of SCSI command protocol, such as Parallel SCSI or Fibre interconnects. Except for the method described above, a cost-effective solution is also provided which uses a low-cost interconnect and communicates over this interconnect using proprietary protocols.

I2C is a low-cost interconnect that supports two-way transfer of data at an acceptable rate of transfer. It is commonly used in PCs to allow the CPU to manage and monitor motherboard and other device status. It is well suited to the task of providing a communication medium between the SVC(s) and the EMS in the local SVS, especially in SAS/SATA SVS that do not already have an interconnect connecting the SVC(s) to the SVS. It does not, by standard, support transport of SCSI command protocol, however, so any implementation using it as the primary communication medium between the SVCs and the EMS in the local SVS will communicate using an alternate protocol, typically a proprietary one.

With I2C as the primary communication medium, EMS could be implemented in two ways. The first is using intelligent circuitry that communicates with the SVC using an intelligent protocol similar to SAF-TE/SES. The second is to integrate "dumb" off-the-shelf I2C latches and/or status monitoring ICs into a management/monitoring circuit and leave all the intelligence to the SVC. The former option has the advantage of allowing the EMS to provide more advanced services, value, and customizations. However, it is typically complicated and expensive to implement. The latter option is easy and inexpensive to implement but typically cannot support advanced functionality.

PSD subsystems in storage virtualization subsystems are designed to emulate typically implement enclosure management services that can be directly managed and monitored by a host over the IO device interconnects that also serve as the primary access interconnects for the PSDs in the subsystem. In these implementations, the EMS circuitry is intelligent and implements standard SCSI protocols for managing and monitoring EMS, such as SAF-TE and SES, that can be transported over the primary access interconnects. In these implementations, EMS controllers will either connect directly to one or more of the primary access IO device interconnects to allow communication with the host directly, a configuration herein referred to as "direct-connect", or rely on pass-through mechanisms supported by those devices that are directly connected to the primary access interconnects (typically, PSDs) to forward requests and associated data from the host to the EMS controller and responses and associated data from the EMS controller to the host, herein referred to as "device-forwarded". Direct connect EMS implementations provide independence from PSDs such that a failure or absence of one or even all PSDs would not affect the operation or accessibility of the EMS. The drawback of direct connect EMS implementations is that they are typically more expensive and complicated to implement. The advantage of device-forwarded EMS implementation is in the ease of implementation and relative cost effectiveness, but suffers from the weakness that failing or absent PSDs could result in the loss of access to the EMS by the host(s).

In order to enhance compatibility with hosts that are designed to interface with actual PSD subsystems, a SVS that is equipped with EMS might support one or more standard SCSI EMS management protocols and one or both of the connection configurations described above, direct-connect and device-forwarded. For direct-connect emulations, the SVC will present the EMS services on a host-side IO device interconnect as a one or more ID/LUNs (logical unit number). The EMS may have dedicated interconnect IDs assigned to it or simply have assigned to it LUNs on IDs that already present on other LUNs. For SAF-TE emulations, the SVC must present EMS SAF-TE device(s) on dedicated IDs. For direct-connect SES emulations, the EMS SES device(s) could be presented on dedicated IDs or on IDs presenting other LUNs. For device-forwarded emulations, the SVC will simply include information in the INQUIRY string of the virtual PSDs responsible for forwarding the EMS management requests that indicates to the host that one of the functions of the said PSD is to forward such requests to the EMS. Typically, multiple virtual PSDs, and maybe even all of the virtual PSDs presented on the interconnect will be presented as forwarders of EMS management requests so that the absence or failure of one or more virtual PSDs will not result in loss of access to the EMS.

Those skilled in the art will readily observe that numerous modifications and alternations of the device may be made while retaining the teaching of the invention. Accordingly, the above disclosure should be construed as limited only by the metes and bounds of the relevant claims.

What is claimed is:

1. A storage virtualization computer system comprising:
a host entity for issuing host IO requests; and
a storage virtualization subsystem comprising:
an external storage virtualization controller (SVC) coupled to said host entity for executing IO operations in response to said host IO requests; and
a group of physical storage devices (PSDs), each coupled to the storage virtualization controller through a Serial-Attached Small Computer System Interface (SAS) interconnect, for providing data storage space to the storage virtualization computer system through the storage virtualization controller;
wherein said external storage virtualization controller is configured to define at least one logical media unit (LMU) consisting of sections of said group of PSDs and comprising one or more section(s) of each of said group of PSDs, and wherein said external storage virtualization controller is configured to provide a mapping that allows the at least one LMU to be accessible to the host entity;
wherein one of the host IO requests is parsed to determine what operation is to be performed and on which section of the at least one LMU the operation is to be performed; and
wherein when the operation comprises internally-emulated, asynchronous device sub-operations, then the external storage virtualization controller (SVC) executes the associated sub-operations including transferring any associated data to/from the host entity and then, when there is a failed operation, the SVC responds to the host entity with a status report indicating the failed operation;
wherein appropriate device-side IO requests are generated and issued to the appropriate PSDs in response to the asynchronous device sub-operations, and wherein when one of the device-side IO requests does not complete successfully, the SVC engages backup operations that allow successful completion of the sub-operation, where the backup operations include generating other device-side IO requests to some media sections in said group of PSDs whose data is used to recover data that could not be read off while at least one PSD of said group of PSDs is inaccessible; and
wherein when one of the host IO requests from the host entity is received by the SVC, and the one of the host IO requests is a write request, an IO complete report that the one of the host I/O requests is successfully complete is first issued to the host entity by the SVC, and then the SVC completes the operation performed on the section(s) of the LMU associated with the one of the host IO requests.

2. The storage virtualization computer system of claim 1, wherein the operation further comprises a synchronous device sub-operation, and appropriate device-side IO requests are generated and issued to the appropriate PSDs in response.

3. The storage virtualization computer system of claim 1, wherein said group of the PSDs comprises hard disk drives (HDDs) or solid state drives (SSDs).

4. The storage virtualization computer system of claim 1, wherein said group of the PSDs comprises at least one of the following PSDs: Serial Advanced Technology Attachment (SATA) PSDs, Serial-Attached Small Computer System Interface (SAS) PSDs, and Parallel Advanced Technology Attachment (PATA) PSDs.

5. The storage virtualization computer system of claim 1, further comprising a detachable canister attached to said storage virtualization controller for containing one of said group of the PSDs therein.

6. The storage virtualization computer system of claim 1, wherein one of said group of the PSDs is detached from said storage virtualization controller when said storage virtualization controller is on-line.

7. The storage virtualization computer system of claim 1, wherein a new PSD is attached to said storage virtualization controller when said storage virtualization controller is on-line.

8. The storage virtualization computer system of claim 1, wherein said group of PSDs include a first set of PSDs and a second set of PSDs, said first set of PSDs and said external storage virtualization controller are in the same enclosure, said first set of PSDs and said second set of PSDs are not received in a same enclosure, and said external storage virtualization controller further comprises at least one expansion port for coupling to said second set of said PSDs.

9. The storage virtualization computer system of claim 1, wherein said external SVC is configured to accommodate said group of PSDs having a Serial-Attached Small Computer System Interface (SAS) PSD in said group of PSDs or a Serial Advanced Technology Attachment (SATA) PSD in said group of PSDs connected to the same SAS interconnect.

10. The storage virtualization computer system of claim 1, wherein said storage virtualization controller comprises:
a central processing circuitry for performing IO operations in response to said host IO requests of said host entity;
at least one IO device interconnect controller coupled to said central processing circuitry;
at least one host-side IO device interconnect port provided in a said at least one IO device interconnect controller for coupling to said host entity; and
at least one SAS device-side IO device interconnect port provided in one of said at least one IO device interconnect controller for coupling to said group of physical storage devices (PSDs).

11. The storage virtualization computer system of claim 10, wherein said storage virtualization controller further comprises at least one multiple-device device-side expansion port for accommodating an additional set of at least one PSD.

12. The storage virtualization computer system of claim 10, wherein said storage virtualization controller further comprises at least one expansion port for accommodating an additional set of at least one PSD through an expanding circuit.

13. The storage virtualization computer system of claim 10, wherein said at least one host-side IO device interconnect port and said at least one SAS device-side IO device interconnect port are provided in a same IO device interconnect controller.

14. The storage virtualization computer system of claim 10, wherein said at least one host-side IO device interconnect port and said at least one SAS device-side IO device interconnect port are provided in different IO device interconnect controllers.

15. The storage virtualization computer system of claim 10, wherein said at least one host-side IO device interconnect port is Fibre Channel supporting point-to-point connectivity in target mode.

16. The storage virtualization computer system of claim 10, wherein said at least one host-side IO device interconnect port is Fibre Channel supporting private loop connectivity in target mode.

17. The storage virtualization computer system of claim 10, wherein said at least one host-side IO device interconnect port is Fibre Channel supporting public loop connectivity in target mode.

18. The storage virtualization computer system of claim 10, wherein said at least one host-side IO device interconnect port is parallel SCSI operating in target mode.

19. The storage virtualization computer system of claim 10, wherein said at least one host-side IO device interconnect port is ethernet supporting the Internet Small Computer System Interface (iSCSI) protocol operating in target mode.

20. The storage virtualization computer system of claim 10, wherein said at least one host-side IO device interconnect port is Serial-Attached SCSI (SAS) operating in target mode.

21. The storage virtualization computer system of claim 10, wherein said at least one host-side IO device interconnect port is Serial ATA operating in target mode.

22. The storage virtualization computer system of claim 10, wherein said at least one host-side IO device interconnect port is one of Institute of Electrical and Electronics Engineers (IEEE)1394A/IEEE1394B and Universal Serial Bus (USB)/USB2.0.

23. The storage virtualization computer system of claim 10, wherein said external SVC issues a device-side IO request to said IO device interconnect controller, and said IO device interconnect controller re-formats said device-side IO request and accompanying IO data into at least one data packet for transmission to said group of PSDs through said device-side IO device interconnect port.

24. The storage virtualization computer system of claim 1, wherein the SVC is configured to dynamically adjust a distribution of IO device requests among the various PSDs and/or IO device interconnects to optimize collective PSD/Interconnect bandwidth.

25. The storage virtualization computer system of claim 1, wherein each of said PSDs has storage unit ports in a dual port pair, and said storage virtualization controller comprises a plurality of SVC ports, and a redundant pair of the SVC ports that are provided on said storage virtualization controller, are connected to the storage unit ports in the dual port pair through a pair of redundant paths, and when access to the group of PSDs by the SVC through one of the redundant paths is failed, the access to the group of PSDs by the SVC is still accomplished through the other path in the redundant paths.

26. A storage virtualization subsystem for providing data storage space, comprising:
    an external storage virtualization controller (SVC) for connecting to a host entity and executing IO operations in response to host IO requests issued from said host entity; and
    a group of physical storage devices (PSDs), each coupled to the storage virtualization controller through a Serial-Attached Small Computer System Interface (SAS) interconnect, for providing data storage space to the host entity through the storage virtualization controller;
    wherein said external storage virtualization controller is configured to define at least one logical media unit (LMU) consisting of sections of said group of PSDs and comprising one or more section(s) of each of said group of PSDs, and wherein said external storage virtualization controller is configured to provide a mapping that allows the at least one LMU to be accessible to the host entity;
    wherein one of the host IO requests is parsed to determine what operation is to be performed and on which section of the at least one LMU the operation is to be performed;
    wherein when the operation comprises internally-emulated, asynchronous device sub-operations, then the external storage virtualization controller (SVC) executes the associated sub-operations including transferring any associated data to/from the host entity and then, when there is a failed operation, the SVC responds to the host entity with a status report indicating the failed operation;
    wherein appropriate device-side IO requests are generated and issued to the appropriate PSDs in response to the asynchronous device sub-operations, and wherein when one of the device-side IO requests does not complete successfully, the SVC engages backup operations that allow successful completion of the sub-operation, where the backup operations include generating other device-side IO requests to some media sections in said group of PSDs whose data is used to recover data that could not be read off while at least one PSD of said group of PSDs is inaccessible; and
    wherein when one of the host IO requests from the host entity is received by the SVC, and the one of the host IO requests is a write request, an IO complete report that the one of the host I/O requests is successfully complete is first issued to the host entity by the SVC, and then the SVC completes the operation performed on the section(s) of the LMU associated with the one of the host IO requests.

27. The storage virtualization subsystem of claim 26, wherein the operation further comprises a synchronous device sub-operation, and appropriate device-side IO requests are generated and issued to the appropriate PSDs in response.

28. The storage virtualization subsystem of claim 26, wherein said group of the PSDs comprises hard disk drives (HDDs) or solid state drives (SSDs).

29. The storage virtualization subsystem of claim 26, wherein said group of the PSDs comprises at least one of the following PSDs: Serial Advanced Technology Attachment (SATA) PSDs, Serial-Attached Small Computer System Interface (SAS) PSDs, and Parallel Advanced Technology Attachment (PATA) PSDs.

30. The storage virtualization subsystem of claim 26, further comprising a detachable canister attached to said storage virtualization controller for containing one of said group of the PSDs therein.

31. The storage virtualization subsystem of claim 26, wherein one of said group of the PSDs is detached from said storage virtualization controller when said storage virtualization controller is on-line.

32. The storage virtualization subsystem of claim 26, wherein a new PSD is attached to said storage virtualization controller when said storage virtualization controller is on-line.

33. The storage virtualization subsystem of claim 26, wherein said group of PSDs include a first set of PSDs and a second set of PSDs, said first set of PSDs and said external storage virtualization controller are in the same enclosure, said first set of PSDs and said second set of PSDs are not received in a same enclosure, and said external storage virtualization controller further comprises at least one expansion port for coupling to said second set of said PSDs.

34. The storage virtualization subsystem of claim 26, wherein said external SVC is configured to accommodate said group of PSDs having a Serial Attached Small Computer System Interface (SAS) PSD in said group of PSDs or a Serial Advanced Technology Attachment (SATA) PSD in said group of PSDs connected to the same SAS interconnect.

35. The storage virtualization subsystem of claim 26, wherein said storage virtualization controller comprises:
a central processing circuitry for performing IO operations in response to said host IO requests of said host entity;
at least one IO device interconnect controller coupled to said central processing circuitry;
at least one host-side IO device interconnect port provided in a said at least one IO device interconnect controller for coupling to said host entity; and
at least one SAS device-side IO device interconnect port provided in one of said at least one IO device interconnect controller for coupling to said group of physical storage devices (PSDs).

36. The storage virtualization subsystem of claim 35, wherein said storage virtualization controller further comprises at least one multiple-device device-side expansion port for accommodating an additional set of at least one PSD.

37. The storage virtualization subsystem of claim 35, wherein said storage virtualization controller further comprises at least one expansion port for accommodating an additional set of at least one PSD through an expanding circuit.

38. The storage virtualization subsystem of claim 35, wherein said at least one host-side IO device interconnect port and said at least one SAS device-side IO device interconnect port are provided in a same IO device interconnect controller.

39. The storage virtualization subsystem of claim 35, wherein said at least one host-side IO device interconnect port and said at least one SAS device-side IO device interconnect port are provided in different IO device interconnect controllers.

40. The storage virtualization subsystem of claim 35, wherein said at least one host-side IO device interconnect port comprises at least one of the following port types: Fibre Channel supporting point-to-point connectivity in target mode, Fibre Channel supporting private loop connectivity in target mode, Fibre Channel supporting public loop connectivity in target mode, parallel Small Computer System Interface (SCSI) operating in target mode, ethernet supporting the Internet Small Computer System Interface (iSCSI) protocol operating in target mode Serial-Attached Small Computer System Interface (SAS) operating in target mode, Serial Advanced Technology Attachment (SATA) operating in target mode, Institute of Electrical and Electronics Engineers (IEEE)1394A/IEEE1394B, and Universal Serial Bus (USB)/USB2.0.

41. The storage virtualization subsystem of claim 35, wherein said external SVC issues a device-side IO request to said IO device interconnect controller, and said IO device interconnect controller re-formats said device-side IO request and accompanying IO data into at least one data packet for transmission to said group of PSDs through said device-side IO device interconnect port.

42. The storage virtualization subsystem of claim 26, wherein each of said PSDs has storage unit ports in a dual port pair, and said storage virtualization controller comprises a plurality of SVC ports, and a redundant pair of the SVC ports that are provided on said storage virtualization controller, are connected to the storage unit ports in the dual port pair through a pair of redundant paths, and when access to the group of PSDs by the SVC through one of the redundant paths is failed, the access to the group of PSDs by the SVC is still accomplished through the other path in the redundant paths.

43. An external storage virtualization controller (SVC) of a storage virtualization subsystem, comprising:
a central processing circuitry for performing IO operations in response to host IO requests from a host entity;
at least one IO device interconnect controller coupled to said central processing circuitry;
at least one host-side IO device interconnect port provided in a said at least one IO device interconnect controller for coupling to said host entity; and
at least one Serial Attached Small Computer System Interface (SAS) device-side IO device interconnect port provided in a said at least one IO device interconnect controller for coupling to and performing point-to-point serial-signal transmission with a group of one physical storage devices (PSDs);
wherein said external storage virtualization controller is configured to define at least one logical media unit (LMU) consisting of sections of said group of PSDs and comprising one or more section(s) of each of said group of PSDs, and wherein said external storage virtualization controller is configured to provide a mapping that allows the at least one LMU to be accessible to the host entity;
wherein one of the host IO requests is parsed to determine what operation is to be performed and on which section of the at least one LMU the operation is to be performed;
wherein when the operation comprises internally-emulated, asynchronous device sub-operations, then the SVC executes the associated sub-operations including transferring any associated data to/from the host entity and then, when there is a failed operation, the SVC responds to the host entity with a status report indicating the failed operation;

wherein appropriate device-side IO requests are generated and issued to the appropriate PSDs in response to the asynchronous device sub-operations, and wherein when one of the device-side IO requests does not complete successfully, the SVC engages backup operations that allow successful completion of the sub-operation, where the backup operations include generating other device-side IO requests to some media sections in said group of PSDs whose data is used to recover data that could not be read off while at least one PSD of said group of PSDs is inaccessible; and wherein when one of the host IO requests from the host entity is received by the SVC, and the one of the host IO requests is a write request, an IO complete report that the one of the host I/O requests is successfully complete is first issued to the host entity by the SVC, and then the SVC completes the operation performed on the section(s) of the LMU associated with the one of the host IO requests.

44. The external storage virtualization controller of claim 43, wherein the operation further comprises a synchronous device sub-operation, and appropriate device-side IO requests are generated and issued to the appropriate PSDs in response.

45. The external storage virtualization controller of claim 43, wherein said group of the PSDs comprises hard disk drives (HDDs) or solid state drives (SSDs).

46. The external storage virtualization controller of claim 43 further comprising a detachable canister attached to said storage virtualization controller for containing one of said group of the PSDs therein.

47. The external storage virtualization controller of claim 43, wherein one of said group of the PSDs is detached from said storage virtualization controller when said storage virtualization controller is on-line.

48. The external storage virtualization controller of claim 43, wherein a new PSD is attached to said storage virtualization controller when said storage virtualization controller is on-line.

49. The external storage virtualization controller of claim 43, wherein said group of PSDs include a first set of PSDs and a second set of PSDs, said first set of PSDs and said external storage virtualization controller are in the same enclosure, said first set of PSDs and said second set of PSDs are not received in a same enclosure, and said external storage virtualization controller further comprises at least one multiple-device device-side expansion port for coupling to said second set of said PSDs.

50. The external storage virtualization controller of claim 43, wherein said at least one host-side IO device interconnect port and said at least SAS device-side IO device interconnect port are provided in a same IO device interconnect controller.

51. The external storage virtualization controller of claim 43, wherein said at least one host-side IO device interconnect port and said at least one SAS device-side IO device interconnect port are provided in different IO device interconnect controllers.

52. The external storage virtualization controller of claim 43, wherein said external SVC issues a device-side IO request to said IO device interconnect controller, and said IO device interconnect controller re-formats said device-side IO request and accompanying IO data into at least one data packet for transmission to said group of PSDs through said device-side IO device interconnect port.

53. The external storage virtualization controller of claim 43, wherein said device-side IO device interconnect controller further comprises a Peripheral Component Interconnect (PCI)/Peripheral Component Interconnect eXtended (PCI-X) interface for connecting to the central processing circuit.

54. The external storage virtualization controller of claim 43, wherein said device-side IO device interconnect controller further comprises a Peripheral Component Interconnect Express (PCI Express) interface for connecting to the central processing circuit.

55. The external storage virtualization controller of claim 43, wherein said storage virtualization controller comprises at least one host-side IO device interconnect port each for coupling to a host-side IO device interconnect.

56. The external storage virtualization controller of claim 43 further comprising at least one multiple-device device-side expansion port for accommodating a second set of at least one PSD.

57. The external storage virtualization controller of claim 43 further comprising at least one expansion port for accommodating a second set of at least one PSD through an expanding circuit.

58. The external storage virtualization controller of claim 43, wherein said at least one host-side IO device interconnect port comprises at least one of the following port types: Fibre Channel supporting point-to-point connectivity in target mode, Fibre Channel supporting private loop connectivity in target mode, Fibre Channel supporting public loop connectivity in target mode, parallel Small Computer System Interface (SCSI) operating in target mode, ethernet supporting the Internet Small Computer System Interface (iSCSI) protocol operating in target mode Serial-Attached Small Computer System Interface (SAS) operating in target mode, Serial Advanced Technology Attachment (SATA) operating in target mode, Institute of Electrical and Electronics Engineers (IEEE)1394A/IEEE1394B, and Universal Serial Bus (USB)/USB2.0.

59. The external storage virtualization controller of claim 43, wherein each of said PSDs has storage unit ports in a dual port pair, and said storage virtualization controller comprises a plurality of SVC ports, and a redundant pair of the SVC ports that are provided on said storage virtualization controller, are connected to the storage unit ports in the dual port pair through a pair of redundant paths, and when access to the group of PSDs by the SVC through one of the redundant paths is failed, the access to the group of PSDs by the SVC is still accomplished through the other path in the redundant paths.

60. A method for performing storage virtualization in a storage virtualization computer system with an external storage virtualization controller (SVC) of a storage virtualization subsystem, comprising:
  receiving a host IO request from a host entity of the computer system with the storage virtualization controller;
  parsing the host IO request with the storage virtualization controller to decide at least one IO operation to perform in response to said host IO request; and
  performing at least one IO operation with the storage virtualization controller to access a group of physical storage devices (PSDs) of the storage virtualization subsystem in point-to-point serial-signal transmission complying with Serial-Attached Small Computer System Interface (SAS) protocol;
  wherein said external storage virtualization controller is configured to define at least one logical media unit (LMU) consisting of sections of said group of PSDs and comprising one or more section(s) of each of said group of PSDs, and wherein said external storage virtualization controller is configured to provide a mapping that allows the at least one LMU to be accessible to the host entity;

wherein the host IO request is parsed to determine what operation is to be performed and on which section of the at least one LMU the operation is to be performed;

wherein when the operation comprises internally-emulated, asynchronous device sub-operations, then the storage virtualization controller (SVC) executes the associated sub-operations including transferring any associated data to/from the host entity and then, when there is a failed operation, the SVC responds to the host entity with a status report indicating the failed operation;

wherein appropriate device-side IO requests are generated and issued to the appropriate PSDs in response to the asynchronous device sub-operations, and wherein when one of the device-side IO requests does not complete successfully, the SVC engages backup operations that allow successful completion of the sub-operation, where the backup operations include generating other device-side IO requests to some media sections in said group of PSDs whose data is used to recover data that could not be read off while at least one PSD of said group of PSDs is inaccessible; and wherein when the host IO request from the host entity is received by the SVC, and the host IO request is a write request, an IO complete report that the host I/O request is successfully complete is first issued to the host entity by the SVC, and then the SVC completes the operation performed on the section(s) of the LMU associated with the host IO request.

61. The method of claim 60, wherein the step of performing said at least one IO operation comprises issuing at least one device-side IO request to a SAS device-side IO device interconnect controller provided in the storage virtualization controller (SVC) and re-formatting said device-side IO request and accompanying IO data by said SAS device-side IO device interconnect controller into at least one data packet complying with SAS protocol for transmission.

62. The method of claim 60, wherein the operation further comprises a synchronous device sub-operation, and appropriate device-side IO requests are generated and issued to the appropriate PSDs in response.

63. The method of claim 60, wherein said group of the PSDs comprises hard disk drives (HDDs) or solid state drives (SSDs).

64. The method of claim 60, wherein said group of the PSDs comprises at least one of the following PSDs: Serial Advanced Technology Attachment (SATA) PSDs, Serial-Attached Small Computer System Interface (SAS) PSDs, and Parallel Advanced Technology Attachment (PATA) PSDs.

65. The method of claim 60, further comprising a detachable canister attached to said storage virtualization controller for containing one of said group of the PSDs therein.

66. The method of claim 60, wherein one of said group of the PSDs is detached from said storage virtualization controller when said storage virtualization controller is on-line.

67. The method of claim 60, wherein a new PSD is attached to said storage virtualization controller when said storage virtualization controller is on-line.

68. The method of claim 60, wherein said group of PSDs include a first set of PSDs and a second set of PSDs, said first set of PSDs and said external storage virtualization controller are in the same enclosure, said first set of PSDs and said second set of PSDs are not received in a same enclosure, and said external storage virtualization controller further comprises at least one expansion port for coupling to said second set of said PSDs.

69. The method of claim 60, wherein said external SVC is configured to accommodate said group of PSDs having a SAS PSD in said group of PSDs or a Serial Advanced Technology Attachment (SATA) PSD in said group of PSDs connected to the same SAS interconnect.

70. The method of claim 60, wherein said storage virtualization controller comprises:
- a central processing circuitry for performing IO operations in response to said host IO requests of said host entity;
- at least one IO device interconnect controller coupled to said central processing circuitry;
- at least one host-side IO device interconnect port provided in a said at least one IO device interconnect controller for coupling to said host entity; and
- at least one SAS device-side IO device interconnect port provided in one of said at least one IO device interconnect controller for coupling to said group of physical storage devices (PSDs).

71. The method of claim 70, wherein said storage virtualization controller further comprises at least one multiple-device device-side expansion port for accommodating an additional set of at least one PSD.

72. The method of claim 70, wherein said storage virtualization controller further comprises at least one expansion port for accommodating an additional set of at least one PSD through an expanding circuit.

73. The method of claim 70, wherein said at least one host-side IO device interconnect port and said at least one SAS device-side IO device interconnect port are provided in a same IO device interconnect controller.

74. The method of claim 70, wherein said at least one host-side IO device interconnect port and said at least one SAS device-side IO device interconnect port are provided in different IO device interconnect controllers.

75. The method of claim 70, wherein at least one said host-side IO device interconnect port comprises at least one of the following port types: Fibre Channel supporting point-to-point connectivity in target mode, Fibre Channel supporting private loop connectivity in target mode, Fibre Channel supporting public loop connectivity in target mode, parallel Small Computer System Interface (SCSI) operating in target mode, ethernet supporting the Internet Small Computer System Interface (iSCSI) protocol operating in target mode Serial-Attached Small Computer System Interface (SAS) operating in target mode, Serial Advanced Technology Attachment (SATA) operating in target mode, Institute of Electrical and Electronics Engineers (IEEE)1394A/ IEEE1394B, and Universal Serial Bus (USB)/USB2.0.

76. The method of claim 70, wherein said external SVC issues a device-side IO request to said IO device interconnect controller, and said IO device interconnect controller re-formats said device-side IO request and accompanying IO data into at least one data packet for transmission to said group of PSDs through said device-side IO device interconnect port.

77. The method of claim 60, wherein each of said PSDs has storage unit ports in a dual port pair, and said storage virtualization controller comprises a plurality of SVC ports, and a redundant pair of the SVC ports that are provided on said storage virtualization controller, are connected to the storage unit ports in the dual port pair through a pair of redundant paths, and when access to the group of PSDs by the SVC through one of the redundant paths is failed, the access to the group of PSDs by the SVC is still accomplished through the other path in the redundant paths.

* * * * *